US012596451B2

(12) United States Patent　　(10) Patent No.:　　US 12,596,451 B2
Bang et al.　　(45) Date of Patent:　　Apr. 7, 2026

(54) TOUCH DETECTION MODULE AND DISPLAY DEVICE INCLUDING THE SAME

(71) Applicant: Samsung Display Co., Ltd., Yongin-Si (KR)

(72) Inventors: Ki Ho Bang, Yongin-si (KR); Won Suk Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/136,349

(22) Filed: Apr. 19, 2023

(65) Prior Publication Data

US 2024/0004494 A1　　Jan. 4, 2024

(30) Foreign Application Priority Data

Jun. 29, 2022　　(KR) ........................ 10-2022-0079720

(51) Int. Cl.
　　G06F 3/041　　　　(2006.01)
　　G06F 3/044　　　　(2006.01)
(52) U.S. Cl.
　　CPC ........ G06F 3/04164 (2019.05); G06F 3/0412 (2013.01); G06F 3/0445 (2019.05); G06F 3/0446 (2019.05); *G06F 2203/04112* (2013.01)
(58) Field of Classification Search
　　CPC .. G06F 3/04164; G06F 3/0412; G06F 3/0445; G06F 3/0446; G06F 2203/04112; G06F 3/041; G06F 3/0443; G06F 3/0416; G06F 3/046; G02F 1/13338; H10K 50/844; H10K 59/40
　　See application file for complete search history.

(56) References Cited

U.S. PATENT DOCUMENTS

| | | | |
|---|---|---|---|
| 11,355,561 B2 | 6/2022 | Park et al. | |
| 11,392,255 B2 | 7/2022 | Bang | |
| 11,422,664 B2 | 8/2022 | Kim et al. | |
| 11,481,064 B2 | 10/2022 | Jeong | |
| 2014/0115878 A1* | 5/2014 | Kimura ................. | G06F 3/0443 29/622 |

(Continued)

FOREIGN PATENT DOCUMENTS

| | | |
|---|---|---|
| KR | 2020-0060603 A | 6/2020 |
| KR | 2020-0145887 A | 12/2020 |
| KR | 2021-0142036 A | 11/2021 |

*Primary Examiner* — Temesghen Ghebretinsae
*Assistant Examiner* — Ivelisse Martinez Quiles
(74) *Attorney, Agent, or Firm* — Innovation Counsel LLP

(57) ABSTRACT

Provided is a display device comprising a touch detection module including a plurality of driving electrodes arranged side by side in a touch sensing area, a plurality of sensing electrodes alternately arranged with the plurality of driving electrodes, a plurality of touch driving lines arranged in a touch peripheral area to supply touch driving signals to the plurality of driving electrodes, a plurality of touch sensing lines arranged in the touch peripheral area to transmit touch driving electrodes to the plurality of driving electrodes, and a touch driving circuit receiving the touch sensing signal to detect a touch position coordinate, wherein at least one of the lines among the plurality of touch driving lines and the plurality of touch sensing lines is formed to have a first interval or a second interval according to a preset size of a foreign material.

21 Claims, 19 Drawing Sheets

(56)          References Cited

U.S. PATENT DOCUMENTS

| | | | |
|---|---|---|---|
| 2016/0041643 A1* | 2/2016 | Gu | G06F 3/0443 |
| | | | 345/174 |
| 2016/0253009 A1* | 9/2016 | Xie | G06F 3/0443 |
| | | | 345/173 |
| 2019/0074328 A1* | 3/2019 | Park | G06F 3/0446 |
| 2022/0129134 A1* | 4/2022 | Song | G06F 3/0412 |
| 2022/0137742 A1* | 5/2022 | Kim | G06F 3/0443 |
| | | | 345/174 |
| 2023/0052993 A1* | 2/2023 | Park | G06F 3/0412 |

* cited by examiner

SL : RL,TL1,TL2

CFL: CFL1, CFL2, CFL3

SL : RL,TL1,TL2

SL : RL,TL1,TL2

TOUCH DETECTION MODULE AND DISPLAY DEVICE INCLUDING THE SAME

This application claims priority from Korean Patent Application No. 10-2022-0079720 filed on Jun. 29, 2022 in the Korean Intellectual Property Office, and all the benefits accruing therefrom under 35 U.S.C. 119, the contents of which in its entirety are herein incorporated by reference.

BACKGROUND

1. Field of the Disclosure

The present disclosure generally relates to a display device. More particularly, the present disclosure relates to a touch detection module and a display device including the same capable of preventing the occurrence of f-reign substances and defects due to the deposition of foreign substances while simplifying the manufacturing process of the touch sensing unit.

2. Description of the Related Art

As the information-oriented society evolves, various demands for display devices are ever increasing. For example, display devices are being employed by a variety of electronic devices such as smart phones, digital cameras, laptop computers, navigation devices, and smart televisions.

Display devices may be flat panel display devices such as a liquid-crystal display device, a field emission display device, and an organic light-emitting display device. Among such flat panel display devices, a light-emitting display device includes a light-emitting element that can emit light on its own, so that each of the pixels of the display panel can emit light by themselves. Accordingly, a light-emitting display device can display images without a backlight unit that supplies light to the display panel.

Recently, a display device includes a touch detection module for sensing a user's touch as one of interface means. A touch detection module includes a touch sensing unit in which touch electrodes are arranged, and a touch driver circuit that detects a change in the capacitance between the touch electrodes. The touch detection module may be integrally formed on or may be mounted on a part of the display device where images are displayed.

SUMMARY

Aspects of the present disclosure provide a touch detection module that can prevent the occurrence of foreign substances and defects due to the deposition of foreign substances while simplifying the manufacturing process of the touch sensing unit.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an embodiment of the disclosure, a touch detection module comprising a plurality of driving electrodes arranged side by side in a touch sensing area, a plurality of sensing electrodes alternately arranged with the plurality of driving electrodes, a plurality of touch driving lines arranged in a touch peripheral area to supply touch driving signals to the plurality of driving electrodes, a plurality of touch sensing lines arranged in the touch peripheral area to transmit touch driving electrodes to the plurality of driving electrodes, and a touch driving circuit receiving the touch sensing signal to detect a touch position coordinate, wherein at least one of the lines among the plurality of touch driving lines and the plurality of touch sensing lines is formed to have a first interval or a second interval according to a preset size of a foreign material.

In an embodiment, further comprising a plurality of connection electrodes formed in the touch sensing area of a layer different from that of the plurality of driving electrodes and the plurality of sensing electrodes to electrically connect driving electrodes adjacent to each other among the plurality of driving electrodes.

In an embodiment, the plurality of touch sensing lines are formed and arranged in the touch peripheral area so that the first interval is maintained through the same patterning process with the same metal material as those of the plurality of connection electrodes or the plurality of driving electrodes, and wherein the first interval between the plurality of touch sensing lines is formed to be wider than the width of each of the plurality of touch sensing lines.

In an embodiment, the plurality of touch driving lines are formed and arranged in the touch peripheral area so that the second interval is maintained through the same patterning process with the same metal material as those of the plurality of connection electrodes or the plurality of driving electrodes, and wherein the second interval between the plurality of touch driving lines is formed to be wider than the width of each of the plurality of touch driving lines.

In an embodiment, the plurality of touch sensing lines are formed and aligned side by side in one side direction of the touch peripheral area along the bottom surface and one side surface of the touch sensing area, and wherein the plurality of touch driving lines are formed and aligned side by side in one side direction of the same touch peripheral area as the plurality of touch sensing lines so as not to overlap the plurality of touch sensing lines aligned side by side.

In an embodiment, the plurality of touch sensing lines are formed on a first touch insulating layer of the touch peripheral area through the same patterning process of as that of the plurality of connection electrodes, and wherein the plurality of touch driving lines are aligned in the same direction as the odd-numbered or even-numbered touch sensing lines so as to overlap the odd-numbered or even-numbered touch sensing lines among the plurality of touch sensing lines, respectively.

In an embodiment, the plurality of touch sensing lines are disposed to maintain the first interval, and wherein the first interval between the plurality of touch sensing lines is formed to be wider than the width of each of the plurality of touch sensing lines.

In an embodiment, the second width between the plurality of touch driving lines overlapping each of the odd-numbered or even-numbered touch sensing lines is formed to be wider than the width of the plurality of touch driving lines and the first interval.

In an embodiment, the plurality of touch sensing lines are formed on the first touch insulating layer of the touch peripheral area through the same patterning process as that of the plurality of connection electrodes, and wherein the plurality of touch driving lines are formed on a second touch insulating layer of the touch peripheral area through the same patterning process as that of the plurality of driving electrodes so as not to overlap each of the plurality of touch sensing electrodes.

In an embodiment, the plurality of touch driving lines are disposed to maintain the second interval, and wherein the width of each of the plurality of touch driving lines is formed to be wider than the second interval between the plurality of touch driving lines.

In an embodiment, the plurality of touch driving lines are disposed to maintain the second interval, and wherein the second interval between the plurality of touch driving lines is formed to be wider than the width of each of the plurality of touch driving lines.

In an embodiment, the plurality of touch sensing lines are formed on the first touch insulating layer of the touch peripheral area through the same patterning process as that of the plurality of connection electrodes, and wherein the plurality of touch driving lines are formed to overlap each of the plurality of touch sensing on the second touch insulating layer of the touch peripheral area though the same patterning process of that of the plurality of driving electrodes.

In an embodiment, the plurality of touch driving lines are disposed to maintain the second interval, and wherein the width of each of the plurality of touch driving lines is formed to be wider than the second interval between the plurality of touch driving lines.

In an embodiment, the plurality of touch driving lines are disposed to maintain the second interval, and wherein the second interval between the plurality of touch driving lines is formed to be wider than the width of each of the plurality of touch driving lines.

According to an embodiment of the disclosure, a display device comprising a display panel comprising a display area in which a plurality of pixels are disposed, and a touch detection module disposed on the front surface of the display panel to sense a user's touch, wherein the touch detection module comprises a plurality of driving electrodes aligned side by side in a touch sensing area, a plurality of sensing electrodes alternately aligned with the plurality of driving electrodes, a plurality of touch driving lines aligned in a touch peripheral area to supply touch driving signals to the plurality of driving electrodes, a plurality of touch sensing lines aligned in the touch peripheral area to transmit touch sensing signals from the plurality of sensing electrodes, and a touch driving circuit receiving a touch sensing signal to detect a touch position coordinate, wherein at least one of the lines among the plurality of touch driving lines and the plurality of touch sensing lines is formed to have a first interval or a second interval according to a preset size of a foreign material.

In an embodiment, the touch detection module further comprises a plurality of connection electrodes formed in the touch sensing area of a different layer from the plurality of driving electrodes and the plurality of sensing electrodes to electrically connect the driving electrodes adjacent to each other among the plurality of driving electrodes through a plurality of contact holes.

In an embodiment, the plurality of touch sensing lines are formed and aligned side by side in the one side direction of the touch peripheral area along the bottom surface and one side surface of the touch sensing area, and wherein the plurality of touch driving lines are formed and aligned in parallel to the one side direction of the same touch peripheral area as the plurality of the touch sensing lines so as to not overlap the plurality of touch sensing lines aligned side by side.

In an embodiment, the plurality of touch sensing lines are formed on a first touch insulating layer of the touch peripheral area through the same patterning process as the plurality of connection electrodes, and wherein the plurality of touch driving lines are formed on a second touch insulating layer of the touch peripheral area through the same patterning process as the plurality of driving electrodes so that the plurality of touch driving lines do not respectively overlap the plurality of touch sensing lines and are disposed side by side.

In an embodiment, the plurality of touch sensing lines are formed on the first touch insulating layer of the touch peripheral area through the same patterning process as the plurality of connection electrodes, and wherein the plurality of touch driving lines are formed to respectively overlap the plurality of touch sensing lines on the second touch insulating layer of the touch peripheral area through the same patterning process as the plurality of driving electrodes.

In an embodiment, the plurality of touch sensing lines are formed on the first touch insulating layer of the touch peripheral area through the same patterning process as the plurality of connection electrodes, and wherein the plurality of touch driving lines are aligned in the same direction as the odd-numbered or even-numbered touch sensing lines so that the plurality of touch driving lines respectively overlap the odd-numbered or even-numbered touch sensing lines among the plurality of touch sensing lines aligned side by side.

According to an embodiment of the present disclosure, it is possible to simplify the manufacturing process of the touch sensing unit and improve the production yield of the touch sensing module by applying the protective layer removal structure of the touch sensing unit.

According to an embodiment of the present disclosure, it is possible to prevent the occurrence of foreign substances and defects due to deposition of foreign substances by improving the arrangement structure of the touch sensing wires and the touch driving wires in a touch peripheral area.

However, the effects of the present disclosure are not limited to the aforementioned effects, and various other effects are included in the present specification.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF THE EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

Each of the features of the various embodiments of the present disclosure may be combined or combined with each other, in part or in whole, and technically various interlocking and driving are possible. Each embodiment may be implemented independently of each other or may be implemented together in an association.

Hereinafter, embodiments of the present disclosure will be described with reference to the accompanying drawings.

Figure 1:
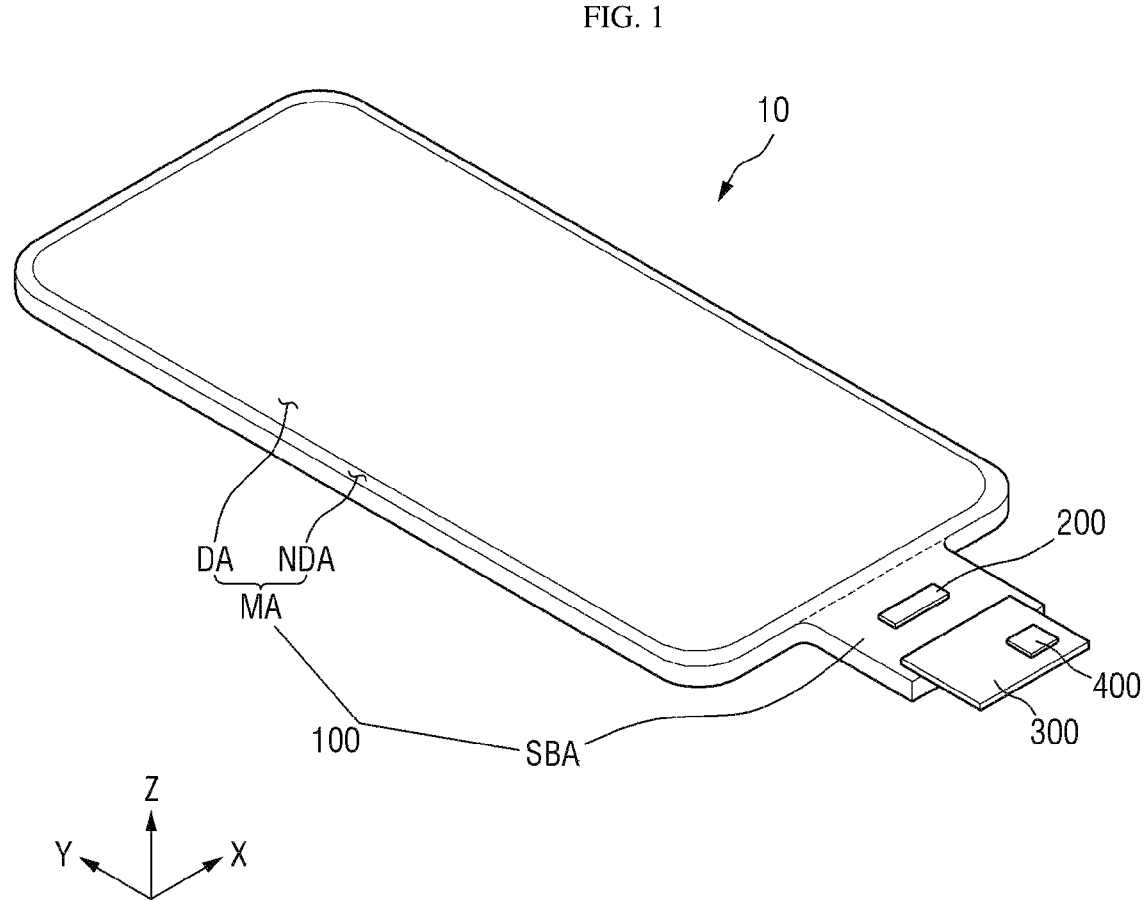
FIG. 1 is a perspective view showing a display device according to one embodiment.
Figure 2:
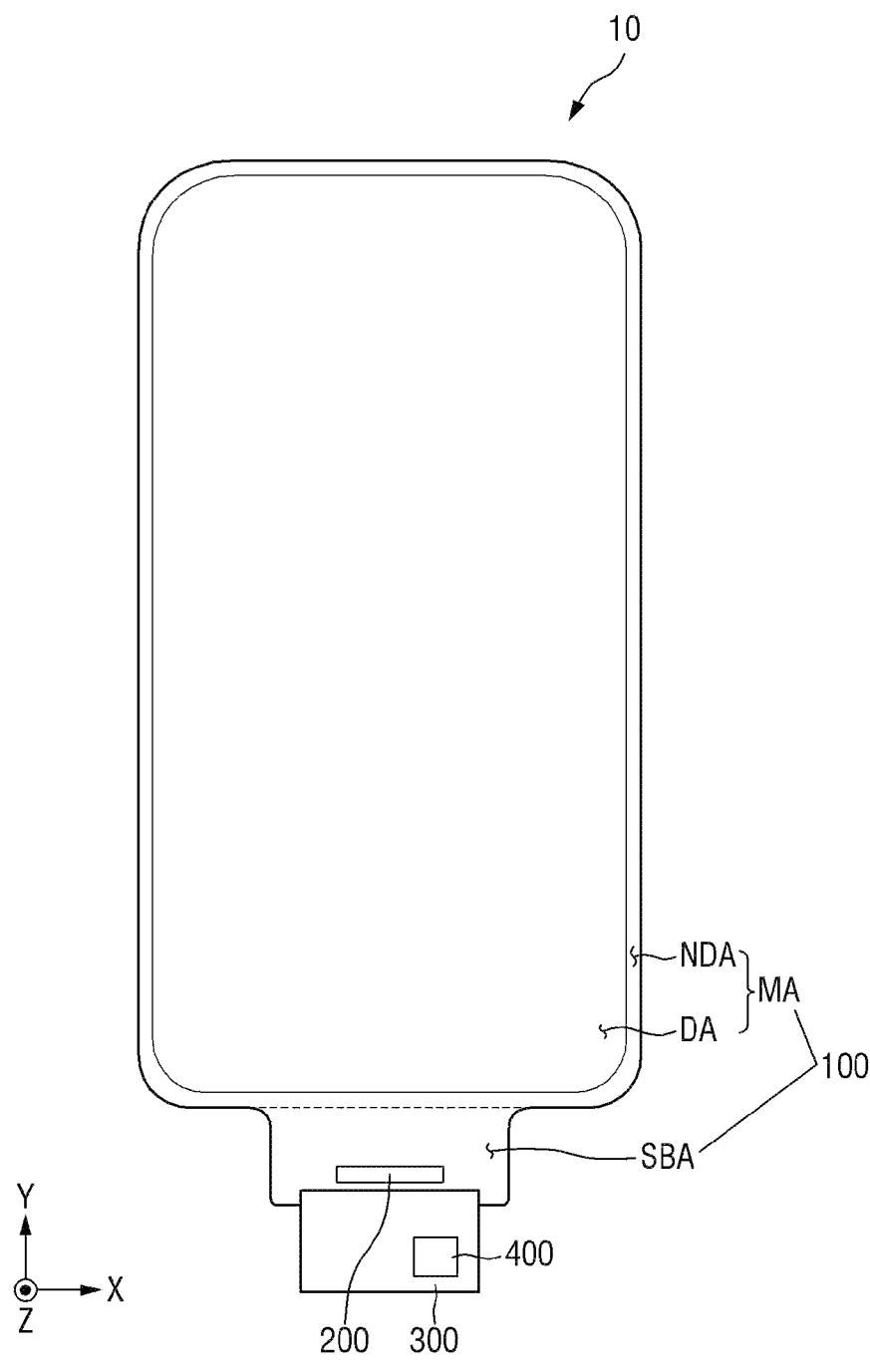
FIG. 2 is a plan view showing a display device according to one embodiment.

FIG. 1 is a perspective view showing a display device according to one embodiment. FIG. 2 is a plan view showing a display device according to one embodiment and FIG. 3 is a side view illustrating a display device according to one embodiment.

Figure 3:
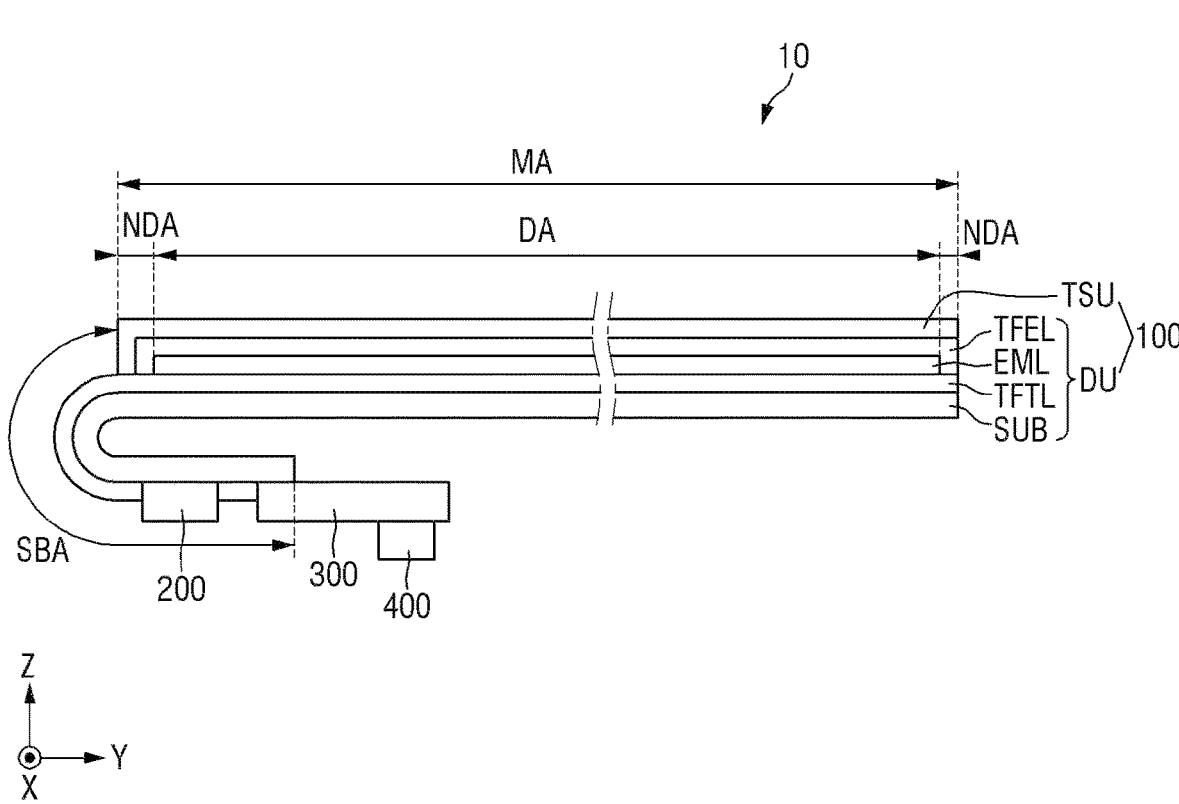
FIG. 3 is a side view illustrating a display device according to one embodiment.

Referring to FIGS. 1, 2, and 3, a display device 10 according to an embodiment of the present disclosure may be employed by portable electronic devices such as a mobile phone, a smart phone, a tablet PC, a mobile communications terminal, an electronic notebook, an electronic book, a portable multimedia player (PMP), a navigation device and an ultra mobile PC (UMPC). Alternatively, the display device 10 according to an embodiment of the present disclosure may be used as a display unit of a television, a laptop computer, a monitor, an electronic billboard, or the Internet of Things (IOT). Alternatively, the display device 10 according to the embodiment of the present disclosure may be applied to wearable devices such as a smart watch, a watch phone, a glasses-type display, and a head-mounted display (HMD) device. Alternatively, the display device 10 according to the embodiment may be used as a center information display (CID) disposed at the instrument cluster, the center fascia or the dashboard of a vehicle, as a room mirror display on the behalf of the side mirrors of a vehicle, as a display placed on the back of each of the front seats that is an entertainment system for passengers at the rear seats of a vehicle.

According to an embodiment of the present disclosure, the display device 10 may be a light-emitting display device such as an organic light-emitting display device using organic light-emitting diodes, a quantum-dot light-emitting display device including quantum-dot light-emitting layer, an inorganic light-emitting display device including an inorganic semiconductor, and an ultra-small light-emitting display device using micro or nano light-emitting diodes (micro LEDs or nano LEDs). In the following description, an organic light-emitting display device is described as an example of the display device 10 according to the embodiment. It is, however, to be understood that the present disclosure is not limited thereto.

According to the embodiment of the present disclosure, the display device 10 includes a display panel 100, a display driver circuit 200, a display circuit board 300 and a touch driver circuit 400.

The display panel 100 may be formed in a rectangular plane having shorter sides in a first direction (x-axis direction) and longer sides in a second direction (y-axis direction) intersecting the first direction (x-axis direction). Each of the corners where the short side in the first direction (x-axis direction) meets the longer side in the second direction (y-axis direction) may be rounded with a predetermined curvature or may be a right angle. The shape of the display panel 100 when viewed from the top is not limited to a quadrangular shape, but may be formed in a different polygonal shape, a circular shape, or an elliptical shape. The display panel 100 may be formed flat, but is not limited thereto. For example, the display panel 100 includes curved portions formed at left and right ends and having a constant curvature or a varying curvature. In addition, the display panel 100 may be formed to be flexible so that it can be curved, bent, folded or rolled.

The display panel 100 includes a main area MA and a subsidiary area SBA.

The main area MA includes a display area DA where images are displayed, and a non-display area NDA around the display area DA. The display area DA includes pixels for displaying images. The subsidiary area SBA may protrude from one side of the main area MA in the second direction (y-axis direction).

Although the subsidiary area SBA is unfolded in the example shown in FIGS. 1 and 2, the subsidiary area SBA may be bent as shown in FIG. 3 and may be disposed on the lower surface of the display panel 100. When the subsidiary area SBA is bent, it may overlap the main area MA in a third direction (z-axis direction), which is the thickness direction of the substrate SUB. In this disclosure, the third direction, the z-axis direction, and the thickness direction may be interchangeably used to describe the same direction. The display driver circuit 200 may be disposed in the subsidiary area SBA.

In addition, as shown in FIG. 3, the display panel 100 includes a substrate SUB, a thin-film transistor layer TFTL, an emission material layer EML, a display module DU including an encapsulation layer TFEL, and a touch sensing unit TSU formed on the front surface of the display module DU.

The thin-film transistor layer TFTL may be disposed on the substrate SUB. The thin-film transistor layer TFTL may be disposed in the main area MA and the subsidiary area SBA. The thin-film transistor layer TFTL includes thin-film transistors.

The emission material layer EML may be disposed on the thin-film transistor layer TFTL. The emission material layer EML may be disposed in the display area DA of the main area MA. The emission material layer EML includes light-emitting elements disposed in emission areas.

The encapsulation layer TFEL may be disposed on the emission material layer EML. The encapsulation layer TFEL may be disposed in the display area DA and the non-display area NDA of the main area MA. The encapsulation layer TFEL includes at least one inorganic layer and at least one organic layer for encapsulating the emission material layer.

The touch sensing unit TSU may be formed on the encapsulation layer TFEL or be mounted on the encapsulation layer TFEL. The touch sensing unit TSU may be disposed in the display area DA of the main area MA. The touch sensing unit TSU may sense a touch of a person or an object using touch electrodes.

A cover window for protecting the display panel 100 from above may be disposed on the touch sensing unit TSU. The cover window may be attached on the touch sensing unit TSU by a transparent adhesive member such as an optically clear adhesive (OCA) film and an optically clear resin (OCR). The cover window may be an inorganic material such as glass, or an organic material such as plastic and polymer material. In order to prevent deterioration of image visibility due to reflection of external light, a polarizing film may be further disposed between the touch sensing unit TSU and the cover window.

The display driver circuit 200 may generate signals and voltages for driving the display panel 100. The display driver circuit 200 may be implemented as an integrated circuit (IC) and may be attached to the display panel 100 by a chip on glass (COG) technique, a chip on plastic (COP) technique, or an ultrasonic bonding. It is, however, to be understood that the present disclosure is not limited thereto. For example, the display driver circuit 200 may be attached on the display circuit board 300 by the chip-on-film (COF) technique.

The display circuit board 300 may be attached to one end of the subsidiary area SBA of the display panel 100. Accordingly, the display circuit board 300 may be electrically connected to the display panel 100 and the display driver circuit 200. The display panel 100 and the display driver circuit 200 may receive digital video data, timing signals, and driving voltages through the display circuit board 300.

The display circuit board 300 may be a flexible printed circuit board, a printed circuit board, or a flexible film such as a chip-on film.

The touch driver circuit 400 may be disposed on the display circuit board 300. The touch driver circuit 400 may be implemented as an integrated circuit (IC) and may be attached on the display circuit board 300.

The touch driver circuit 400 may be electrically connected to the touch electrodes of the touch sensing unit TSU. The touch driver circuit 400 applies touch driving signals to the touch electrodes of the touch sensing unit TSU, and measures a change in the amount of charges stored in the mutual capacitance of each of the plurality of touch nodes formed by the touch electrodes. Specifically, the touch driver circuit 400 measures a change in capacitance of a plurality of touch nodes according to a change in a voltage or an amount of current of a touch sensing signal received through the touch electrodes. In this way, the touch driver circuit 400 may determine whether there is a user's touch or near proximity, based on the amount of a change in the mutual capacitance of each of the plurality of touch nodes. A user's touch refers to that an object such as the user's finger or a pen is brought into contact with a surface of the cover window disposed on the touch sensing unit TSU. A user's near proximity refers to that an object such as the user's finger and a pen is hovering over a surface of the cover window.

The touch driver circuit 400 sets at least one of the touch electrodes and a connection line thereof to be a detection reference line and additionally provides a touch driving signal to at least one detection reference line. In addition, the touch driver circuit 400 sets a touch driving signal detected by the detection reference line to be a detection reference signal. When touch sensing signals are detected through the touch electrodes, the touch driver circuit 400 may compensate the voltage values of the touch sensing signals according to difference voltages between the detection reference signal and the touch sensing signals. For more accurate compensation, the touch driver circuit 400 may turn to and apply another touch electrode and the connection line thereof as the at least detection reference line according to a position where a touch is input.

The touch driver circuit 400 may extract coordinates of a touch by correcting the touch sensing signals according to a level of noise applied in response to low-temperature driving, charging mode, the application of high frequency, an electromagnetic noise-applied state, or the like, or may autonomously switch the driving mode. Specifically, when determining the noise-applied state, the touch driver circuit 400 may perform correction, such as rejection of the touch sensing signals, according to whether a body part or an object is detected through human body detection sensors of the display panel 100. Also, the touch driver circuit 400 may detect a user's touch by selectively changing a touch sensing area according to whether a body part positioned in the forward direction of the display panel 100 is detected, or may change the driving mode to a low-power mode, a standby mode, or the like.

Figure 4:
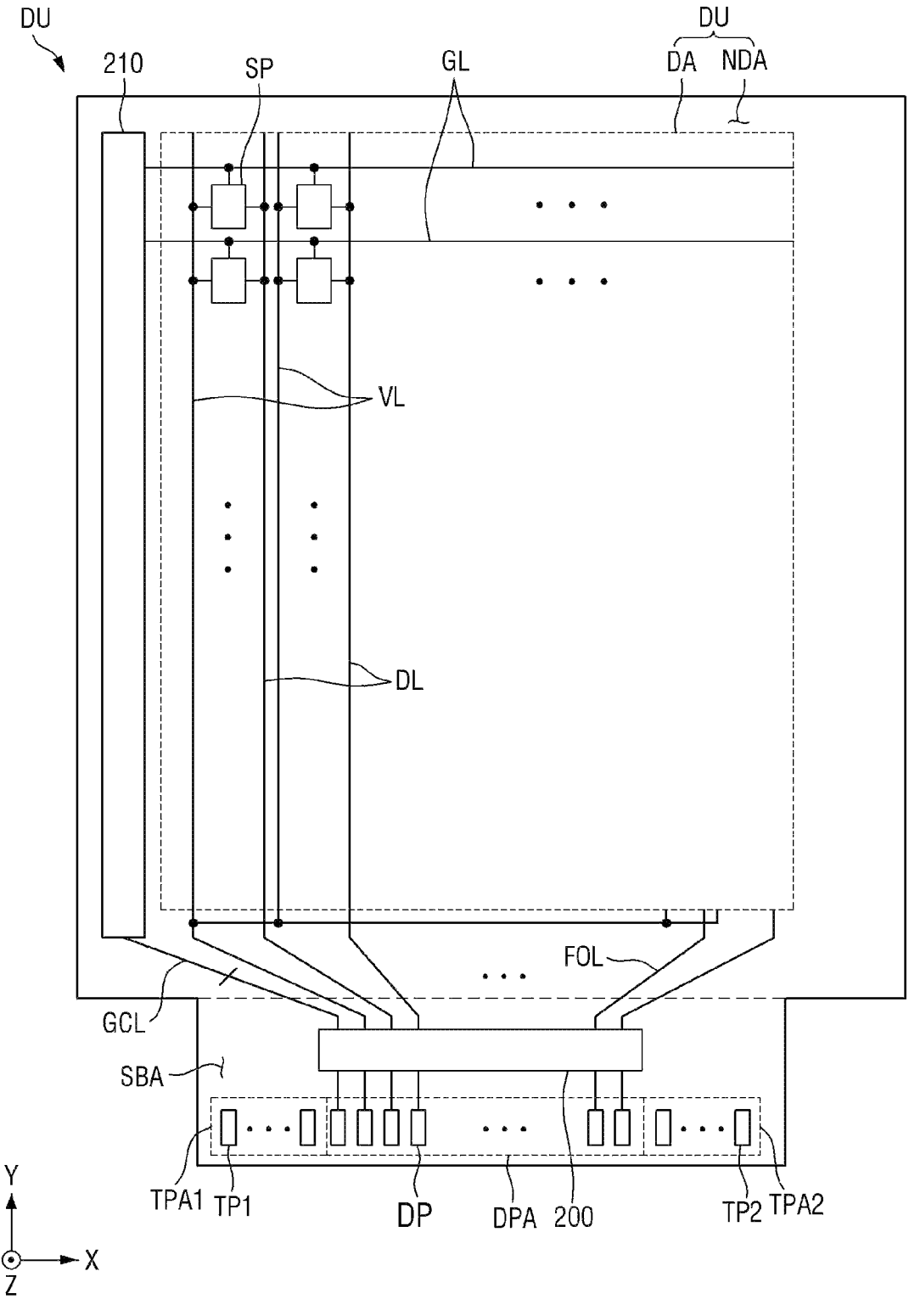
FIG. 4 is a view schematically showing an example of a layout of a display panel illustrated in FIGS. 1, 2, and 3.

FIG. 4 is a view schematically showing an example of a layout of a display panel illustrated in FIGS. 1, 2, and 3. Specifically, FIG. 4 is a view illustrating a layout of the display area DA and the non-display area NDA of the display module DU before the touch sensing unit TSU is formed.

The display area DA may display images and may be defined as a central area of the display panel 100. The display area DA may include a plurality of pixels SP, a plurality of gate lines GL, a plurality of data lines DL and a plurality of voltage lines VL. Each of the plurality of pixels SP may be defined as the minimum unit that outputs light.

The plurality of gate lines GL may supply the gate signals received from a gate driver 210 to the plurality of pixels SP. The plurality of gate lines GL may be extended in the x-axis direction and may be spaced apart from one another in the y-axis direction crossing the x-axis direction.

The plurality of data lines DL may supply the data voltages received from the display driver circuit 200 to the plurality of pixels SP. The plurality of data lines DL may be extended in the y-axis direction and may be spaced apart from one another in the x-axis direction.

The plurality of voltage lines VL may supply the supply voltage received from the display driver circuit 200 to the plurality of pixels SP. The supply voltage may be at least one of a driving voltage, an initialization voltage, and a reference voltage. The plurality of voltage lines VL may be extended in the y-axis direction and may be spaced apart from one another in the x-axis direction.

The non-display area NDA may surround the display area DA. The non-display area NDA may include the gate driver 210, fan-out lines FOL, and gate control lines GCL. The gate driver 210 may generate a plurality of gate signals based on the gate control signal, and may sequentially supply the plurality of gate signals to the plurality of gate lines GL in a predetermined order.

The fan-out lines FOL may be extended from the display driver circuit 200 to the display area DA. The fan-out lines FOL may supply the data voltage received from the display driver circuit 200 to the plurality of data lines DL.

A gate control line GCL may be extended from the display driver circuit 200 to the gate driver 210. The gate control line GCL may supply the gate control signal received from the display driver circuit 200 to the gate driver 210.

The subsidiary area SBA may include the display driver circuit 200, a display pad area DPA, and first and second touch pad areas TPA1 and TPA2.

The display driver circuit 200 may output signals and voltages for driving the display panel 100 to the fan-out lines FOL. The display driver circuit 200 may supply data voltages to the data lines DL through the fan-out lines FOL. The data voltages may be applied to the plurality of pixels SP, so that the luminance of the plurality of pixels SP may be determined. The display driver circuit 200 may supply a gate control signal to the gate driver 210 through the gate control line GCL.

The display pad area DPA, the first touch pad area TPA1, and the second touch pad area TPA2 may be disposed on the edge of the subsidiary area SBA. The display pad area DPA, the first touch pad area TPA1 and the second touch pad area TPA2 may be electrically connected to a circuit board 300 using a low-resistance, high-reliability material such as an anisotropic conductive film and a SAP.

The display pad area DPA may include a plurality of display pads DP. The plurality of display pads DP may be connected to a main processor 500 through the circuit board 300. The plurality of display pads DP may be connected to the circuit board 300 to receive digital video data and may supply digital video data to the display driver circuit 200.

Figure 5:
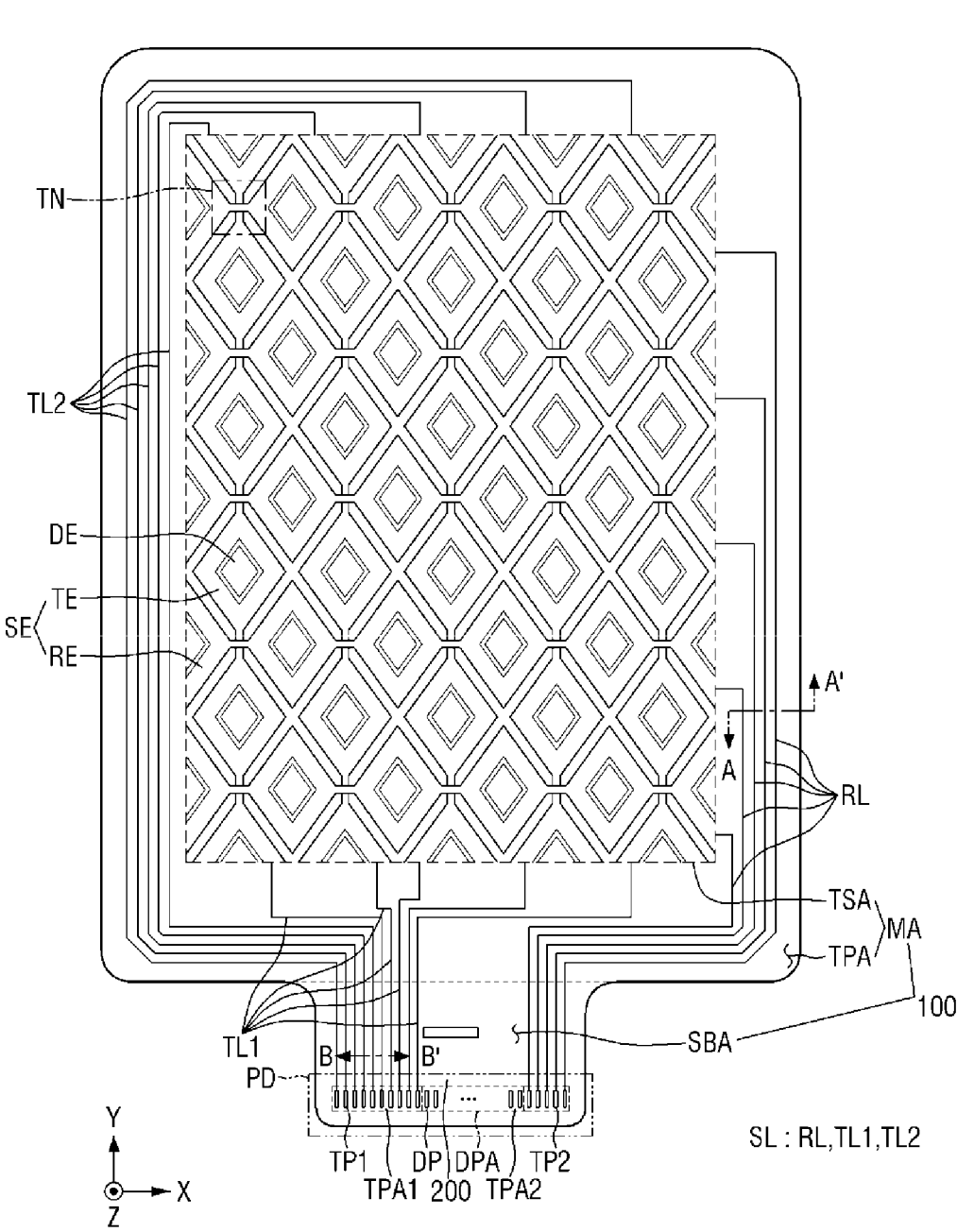
FIG. 5 is a view showing an example of a layout of a touch detection module according to an embodiment of the present disclosure.

FIG. 5 is a view showing an example of a layout of a touch detection module according to an embodiment of the present disclosure.

In FIG. 5, the touch electrodes SE of the main area MA include two kinds of electrodes, e.g., the driving electrodes TE and the sensing electrodes RE. Although the mutual capacitive sensing is described to be carried out by applying touch driving signals to the driving electrode TE, and then sensing the amount of change in the mutual capacitance of each of the touch nodes through the sensing electrodes RE, the present disclosure is not limited thereto.

For convenience of illustration, FIG. 5 shows only some of touch electrodes SEN consisting of the driving electrodes TE and the sensing electrodes RE, dummy patterns DE, touch lines SL, and first and second touch pads TP1 and TP2.

Referring to FIG. 5, the main area MA of the touch sensing unit TSU includes a touch sensing area TSA for sensing a user's touch, and a touch peripheral area TPA disposed around the touch sensing area TSA. The touch sensing area TSA may overlap the display area DA of FIGS. 1, 2, and 3, and the touch peripheral area TPA may overlap the non-display area NDA.

In the touch sensing area TSA, the driving electrodes TE, the sensing electrodes RE and the dummy patterns DE are disposed. The driving electrodes TE and the sensing electrodes RE may be electrodes for forming mutual capacitance to sense a touch of an object or a person.

The sensing electrodes RE may be arranged in the first direction (x-axis direction) and second direction (y-axis direction). The sensing electrodes RE may be electrically connected to one another in the first direction (x-axis direction). The sensing electrodes RE may be connected to one another in the first direction (x-axis direction). The sensing electrodes RE adjacent to one another in the second direction (y-axis direction) may be electrically separated from one another. Accordingly, touch nodes TN where mutual capacitance is formed may be disposed at intersections of the driving electrodes TE and the sensing electrodes RE. A plurality of touch nodes may be associated with the intersections of the driving electrodes TE and the sensing electrodes RE, respectively.

The driving electrodes TE may be arranged in the first direction (x-axis direction) and second direction (y-axis direction). The driving electrodes TE adjacent to one another in the first direction (x-axis direction) may be electrically separated from one another. The driving electrodes TE may be electrically connected to one another in the second direction (y-axis direction). The driving electrodes TE adjacent to one another in the second direction (y-axis direction) may be connected through separate connection electrodes.

Each of the dummy patterns DE may be surrounded by the driving electrode TE or the sensing electrode RE. Each of the dummy patterns DE may be electrically separated from the driving electrode TE or the sensing electrode RE. Each of the dummy patterns DE may be spaced apart from the driving electrode TE or the sensing electrode RE. Each of the dummy patterns DE may be electrically floating.

In FIG. 5, the driving electrodes TE, each of the sensing electrodes RE, and the dummy patterns DE has a diamond shape when viewed from the top, but the present disclosure is not limited thereto. For example, each of the driving electrodes TE, the sensing electrodes RE, and the dummy patterns DE may have other quadrangular shape than a diamond, other polygonal shapes than a quadrangular shape, a circle or an ellipse when viewed from the top.

The touch lines SL may be disposed in the peripheral area of the touch sensing area TSA, that is, the touch peripheral area TPA. The touch lines SL include first touch driving lines TL1 and second touch driving lines TL2 connected to the driving electrodes TE, and touch sensing lines RL connected to the sensing electrodes RE.

The sensing electrodes RE disposed on one side of the touch sensing area TSA may be connected to the touch sensing lines RL, respectively. For example, some of the sensing electrodes RE electrically connected with one another in the first direction (x-axis direction) that are disposed at the right end may be connected to the touch sensing lines RL, respectively, as shown in FIG. 5. Each of the touch sensing lines RL may be connected to a pad unit PD by passing through a part of the touch peripheral area TPA. For example, each of the touch sensing lines RL may be connected one-on-one to second touch pads TP2 disposed on the pad unit PD via the right outer side of the touch sensing area TSA.

The driving electrodes TE disposed at one end of the touch sensing area TSA may be connected to the first touch driving lines TL1, respectively, while the driving electrodes TE disposed at the opposite end of the touch sensing area TSA may be connected to the second touch driving lines TL2, respectively. For example, some of the driving electrodes TE electrically connected to one another in the second direction (y-axis direction) that are disposed at the lower end may be connected to the first touch driving lines TLa, respectively, while some of the driving electrodes TE disposed at the upper end may be connected to the second touch driving lines TLb, respectively. The first or second touch driving lines TL1 and TL2 may be connected to the pad unit PD partially passing the touch peripheral area TPA. For example, the second touch driving lines TL2 may be connected to the driving electrodes TE on the upper side of the touch sensing area TSA via the left outer side of the touch sensing area TSA. In addition, the first and second touch driving lines TL1 and TL2 may be connected to the pad unit PD under the touch sensing area TSA. In this case, the first and second touch driving lines TL1 and TL2 may be connected one-on-one to the first touch pads TP1 disposed on the pad unit PD.

The driving electrodes TE are connected to the first and second touch driving lines TL1 and TL2 on the two sides of the touch sensing area TSA to receive touch driving signals. Accordingly, it is possible to prevent a difference between the touch driving signals applied to the driving electrodes TE disposed on the lower side of touch sensing area TSA and the touch driving signals applied to the driving electrodes TE disposed on the upper side of the touch sensing area TSA due to a RC delay of the touch driving signals.

As shown in FIGS. 1, 2, and 3, when the display circuit board 300 is connected to one side of the flexible film, the display pad area DPA and the first and second touch pad areas TPA1 and TPA2 of the pad unit PD may be associated with pads of the display panel 100 connected to the display circuit board 300. Accordingly, the pads of the display panel 100 may be in contact with the display pads DP, the first touch pads TP1 and the second touch pads TP2. The display pads DP, the first touch pads TP1 and the second touch pads TP2 may be electrically connected to the pads of the display circuit board 300 using a low-resistance, high-reliability material such as an anisotropic conductive film and a SAP. Therefore, the display pads DP, the first touch pads TP1 and the second touch pads TP2 may be electrically connected to the touch driver circuit 400 disposed on the display circuit board 300.

Figure 6:
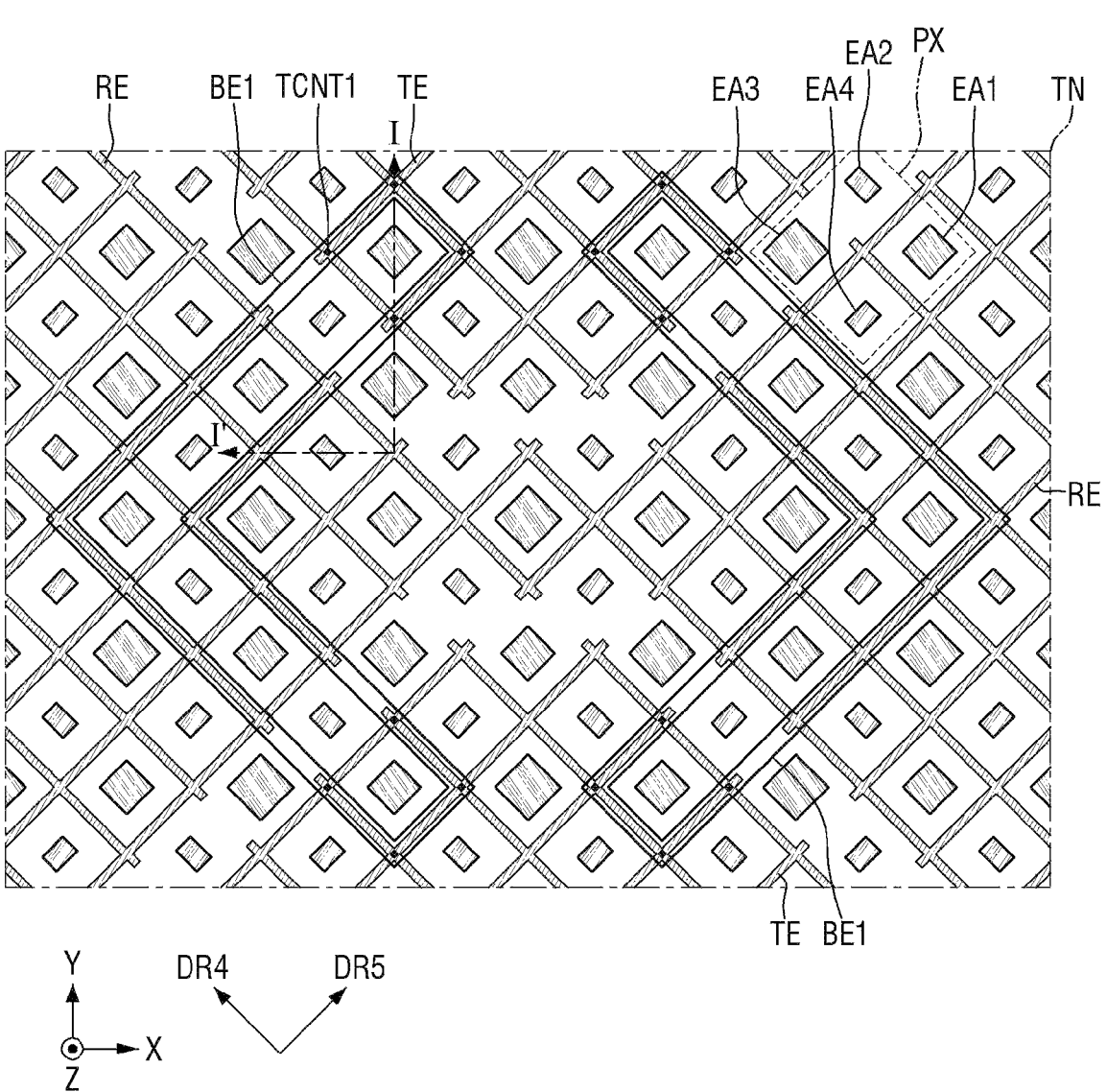
FIG. 6 is an enlarged plan view showing in detail an example of a touch node.

FIG. 6 is an enlarged plan view showing in detail an example of a touch node.

Referring to FIG. 6, the touch nodes TN may be defined as the intersections of the driving electrodes TE and the sensing electrodes RE.

The driving electrodes TE and the sensing electrodes RE are disposed on the same layer and thus they may be spaced apart from each other. That is to say, there may be a gap between adjacent ones of the driving electrodes TE and the sensing electrodes RE.

In addition, the dummy patterns DE may also be disposed on the same layer as the driving electrodes TE and the sensing electrodes RE. That is to say, there may be a gap between adjacent ones of the driving electrodes TE and the dummy patterns DE and between adjacent ones of the sensing electrodes RE and the dummy patterns DE.

Connection electrodes BE1 may be disposed on a different layer from the driving electrodes TE and the sensing electrodes RE. Each of the connection electrodes BE1 may be bent at least once.

Although the connection electrodes BE1 have the shape of angle brackets "<" or ">" in the example shown in FIG. 6, the shape of the connection electrodes BE1 when viewed from the top is not limited thereto. Since the driving electrodes TE adjacent to each other in the second direction (y-axis direction) are connected by the plurality of connection electrodes BE1, even if any of the connection electrodes BE1 is disconnected, the driving electrodes TE can still be stably connected with each other. Although two adjacent ones of the driving electrodes TE are connected by two connection electrodes BE1 in the example shown in FIG. 6, the number of connection electrodes BE1 is not limited to two.

The connection electrodes BE1 may overlap the driving electrodes TE adjacent to one another in the second direction (y-axis direction) in the third direction (z-axis direction), which is the thickness direction of the substrate SUB. The connection electrodes BE1 may overlap the sensing electrodes RE in the third direction (z-axis direction). One side of each of the connection electrodes BE1 may be connected to one of the driving electrodes TE adjacent to each other in the second direction (y-axis direction) through touch contact holes TCNT1. The other side of each of the connection electrodes BE1 may be connected to another one of the driving electrodes TE adjacent to each other in the second direction (y-axis direction) through the touch contact holes TCNT1.

The driving electrodes TE and the sensing electrodes RE may be electrically separated from each other at their intersections by virtue of the connection electrodes BEL. Accordingly, mutual capacitance can be formed between the driving electrodes TE and the sensing electrodes RE.

Each of the driving electrodes TE, the sensing electrodes RE, and the connection electrodes BE1 may have a mesh structure or a net structure when viewed from the top. In addition, each of the dummy patterns DE may have a shape of a mesh structure or a net structure when viewed from the top. Accordingly, the driving electrodes TE, the sensing electrodes RE, the connection electrodes BE1 and the dummy patterns DE may not overlap with emission areas EA1, EA2, EA3, and EA4 of each of the pixels PX. Therefore, it is possible to prevent the luminance of the lights emitted from the emission areas EA1, EA2, EA3, and EA4 from being lowered, which may occur as the lights are covered by the driving electrodes TE, the sensing electrodes RE, the connection electrodes BE1 and the dummy patterns DE.

Each of the pixels PX includes the first emission area EA1 that emits light of a first color, the second emission area EA2 that emits light of a second color, the third emission area EA3 that emits light of a third color, and the fourth emission area EA4 that emits light of the second color. For example, the first color may be red, the second color may be green, and the third color may be blue. Alternatively, the first and third emission areas EA1 and EA3 may emit green light which is light of the second color, the second emission area EA2 may emit red light which is light of the first color, and the fourth emission area EA4 may emit blue light which is light of the third color.

In each of the pixels PX, the first emission area EA1, and second emission area EA2 may be adjacent to each other in a fourth direction DR4, and the third emission area EA3 and the fourth emission area EA4 may be adjacent to each other in the fourth direction DR4. In each of the pixels PX, the first emission area EA1 and fourth emission area EA4 may be adjacent to each other in a fifth direction DR5, and the second emission area EA2 and the third emission area EA3 may be adjacent to each other in the fifth direction DR5.

Each of the first emission area EA1, the second emission area EA2, the third emission area EA3, and the fourth emission area EA4 may have, but is not limited to, a diamond or a rectangular shape when viewed from the top. Each of the first emission area EA1, the second emission area EA2, the third emission area EA3 and the fourth emission area EA4 may have other polygonal shape than a quadrangular shape, a circular shape, or an elliptical shape when viewed from the top. In addition, although the area of the third emission area EA3 is the largest while the area of the second emission area EA2 and the area of the fourth emission area EA4 are the smallest in the example shown in FIG. 7, the present disclosure is not limited thereto.

The second emission areas EA2 and the fourth emission areas EA4 may be arranged in odd rows. The second emission areas EA2 and the fourth emission areas EA4 may be arranged side by side in each of the odd rows in the first direction (x-axis direction). The second emission areas EA2 and the fourth emission areas EA4 may be arranged alternately in odd rows. Each of the second emission areas EA2 may have shorter sides in the fourth direction DR4 and longer sides in the fifth direction DR5, while each of the fourth emission areas EA4 may have longer sides in the fourth direction DR4 and shorter sides in the fifth direction DR5. The fourth direction DR4 may refer to the direction between the first direction (x-axis direction) and the second direction (y-axis direction), which be inclined from the first direction (x-axis direction) by forty-five degrees. The fifth direction DR5 may be a direction perpendicular to the fourth direction DR4.

The first emission areas EA1 and the third emission areas EA3 may be arranged in even rows. The first emission areas EA1 and the third emission areas EA3 may be arranged side by side in each of the even rows in the first direction (x-axis direction). The first emission areas EA1 and the third emission areas EA3 may be alternately arranged in each of the even rows.

The second emission areas EA2 and the fourth emission areas EA4 may be arranged in odd columns. The second emission areas EA2 and the fourth emission areas EA4 may be arranged side by side in each of the odd columns in the second direction (y-axis direction). The second emission areas EA2 and the fourth emission areas EA4 may be arranged alternately in each of the odd columns.

The first emission areas EA1 and the third emission areas EA3 may be arranged in even columns. The first emission areas EA1 and the third emission areas EA3 may be arranged side by side in each of the even columns in the second direction (y-axis direction). The first emission areas EA1 and the third emission areas EA3 may be alternately arranged in each of the even columns.

Figure 7:
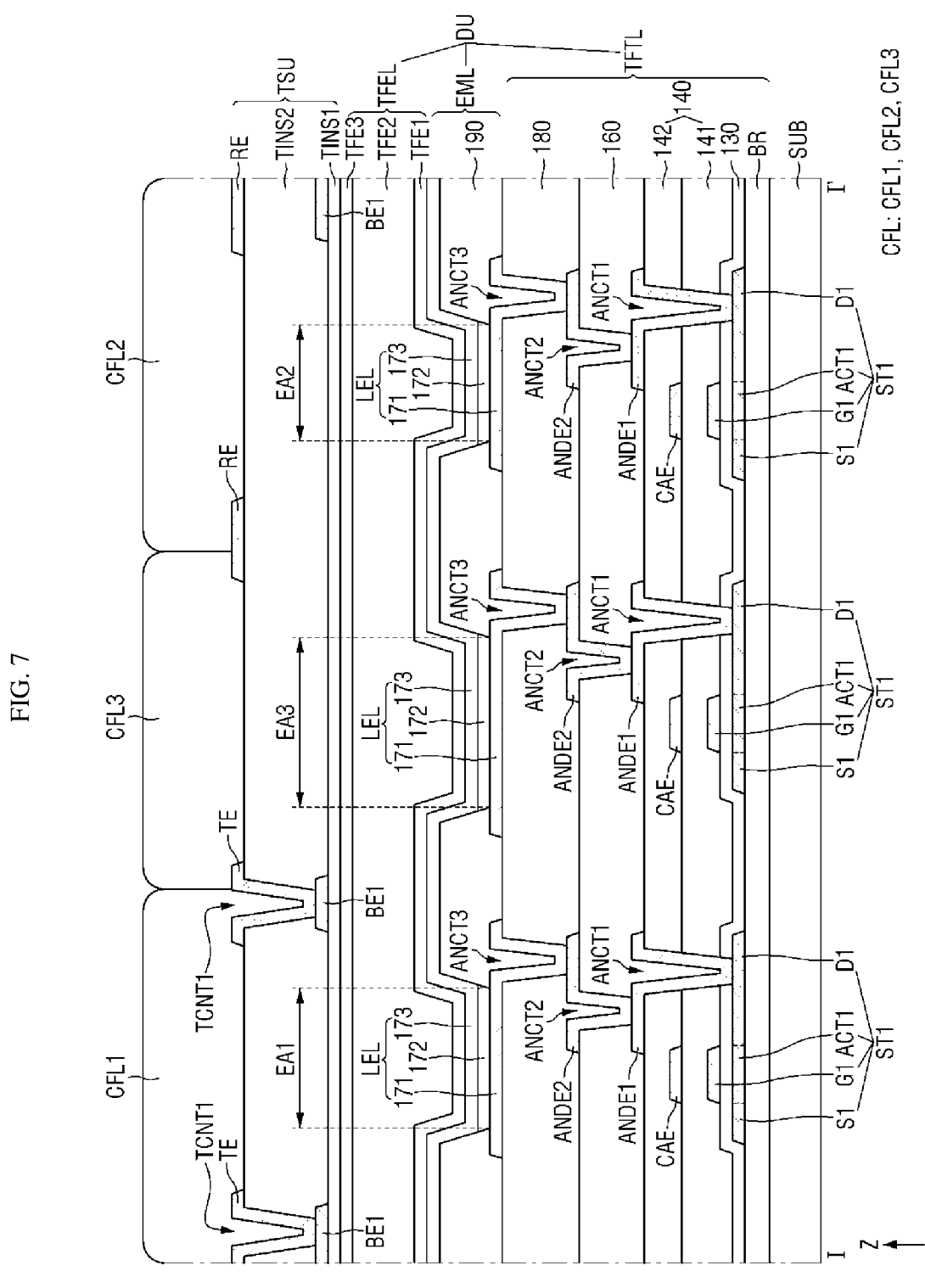
FIG. 7 is a cross-sectional view of an example of a display device taken along line I-I' of FIG. 5.

FIG. 7 is a cross-sectional view showing an example of the display panel taken along line I-I' of FIG. 6.

Referring to FIG. 7, a barrier layer BR may be disposed on the substrate SUB. The substrate SUB may be made of an insulating material such as a polymer resin. For example, the substrate SUB may be made of polyimide. The substrate SUB may be a flexible substrate that can be bent, folded, or rolled.

The barrier layer BR is a film for protecting transistors of the thin-film transistor layer TFTL and an emissive layer 172 of the emission material layer EML from moisture permeating through the substrate SUB which is susceptible to moisture permeation. The barrier layer BR may be formed of multiple inorganic layers stacked on one another alternately. For example, the barrier layer BR may be made up of multiple layers in which one or more inorganic layers of a silicon nitride layer, a silicon oxynitride layer, a silicon oxide layer, a titanium oxide layer and an aluminum oxide layer are alternately stacked on one another.

Thin-film transistors ST1 may be disposed on the barrier layer BR. Each of the thin-film transistors ST1 includes an active layer ACT1, a gate electrode G1, a source electrode S1, and a drain electrode D1.

The active layer ACT1, the source electrode S1, and the drain electrode D1 of each of the thin-film transistors ST1 may be disposed on the barrier layer BR. The active layer ACT1 of each of the thin-film transistors ST1 includes polycrystalline silicon, single crystalline silicon, low-temperature polycrystalline silicon, amorphous silicon, or an oxide semiconductor. A part of the active layer ACT1 overlapping the gate electrode G1 in the third direction (z-axis direction) that is the thickness direction of the substrate SUB may be defined as a channel region. The source electrode S1 and the drain electrode D1 are regions that do not overlap the gate electrode G1 in the third direction (z-axis direction), and may have conductivity by doping ions or impurities into a silicon semiconductor or an oxide semiconductor.

A gate insulator 130 may be disposed on the active layer ACT1, the source electrode S1, and the drain electrode D1 of each of the thin-film transistors ST1. The gate insulator 130 may be formed of an inorganic layer, for example, a silicon nitride layer, a silicon oxynitride layer, a silicon oxide layer, a titanium oxide layer, or an aluminum oxide layer.

The gate electrode G1 of each of the thin-film transistors ST1 may be disposed on the gate insulator 130. The gate electrode G1 may overlap the active layer ACT1 in the third direction (z-axis direction). The gate electrode G1 may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof.

A first interlayer dielectric layer 141 may be disposed on the gate electrode G1 of each of the thin-film transistors ST1. The first interlayer dielectric layer 141 may be formed of an inorganic layer, for example, a silicon nitride layer, a silicon oxynitride layer, a silicon oxide layer, a titanium oxide layer, or an aluminum oxide layer. The first interlayer dielectric layer 141 may be made of a plurality of inorganic layers.

A capacitor electrode CAE may be disposed on the first interlayer dielectric layer 141. The capacitor electrode CAE may overlap the gate electrode G1 of the first thin-film transistor ST1 in the third direction (z-axis direction). Since the first interlayer dielectric layer 141 has a predetermined dielectric constant, a capacitor can be formed by the capacitor electrode CAE, the gate electrode G1, and the first interlayer dielectric layer 141 disposed therebetween. The capacitor electrode CAE may be made up of a single layer or multiple layers of one of molybdenum (Mo), aluminum (Al), chromium (Cr), gold (Au), titanium (Ti), nickel (Ni), neodymium (Nd), and copper (Cu) or an alloy thereof.

A second interlayer dielectric layer 142 may be disposed over the capacitor electrode CAE. The second interlayer dielectric layer 142 may be formed of an inorganic layer, for example, a silicon nitride layer, a silicon oxynitride layer, a silicon oxide layer, a titanium oxide layer, or an aluminum oxide layer. The second interlayer dielectric layer 142 may be made of a plurality of inorganic layers.

A first anode connection electrode ANDE1 may be disposed on the second interlayer dielectric layer 142. The first anode connection electrode ANDE1 may be connected to the drain electrode D1 of the thin-film transistor ST1 through a first connection contact hole ANCT1 that penetrates the gate insulator 130, the first interlayer dielectric layer 141, and the second interlayer dielectric layer 142. The first anode connection electrode ANDE1 may be made up of a single layer or multiple layers of one of molybdenum (Mo), aluminum (Al), chromium (Cr), gold (Au), titanium (Ti), nickel (Ni), neodymium (Nd), and copper (Cu) or an alloy thereof.

A first planarization layer 160 may be disposed over the first anode connection electrode ANDE1 for providing a flat surface over level differences due to the thin-film transistor ST1. The first planarization layer 160 may be formed of an organic layer such as an acryl resin, an epoxy resin, a phenolic resin, a polyamide resin and a polyimide resin.

A second anode connection electrode ANDE2 may be disposed on the first planarization film 160. The second anode connection electrode ANDE2 may be connected to the first anode connection electrode ANDE1 through a second connection contact hole ANCT2 penetrating the first planarization layer 160. The second anode connection electrode ANDE2 may be made up of a single layer or multiple layers of one of molybdenum (Mo), aluminum (Al), chromium (Cr), gold (Au), titanium (Ti), nickel (Ni), neodymium (Nd), and copper (Cu) or an alloy thereof.

A second planarization layer 180 may be disposed on the second anode connection electrode ANDE2. The second planarization layer 180 may be formed as an organic layer such as an acryl resin, an epoxy resin, a phenolic resin, a polyamide resin, and a polyimide resin.

Light-emitting elements LEL and a bank 190 may be disposed on the second planarization layer 180. Each of the light-emitting elements LEL includes a pixel electrode 171, an emissive layer 172, and a common electrode 173.

The pixel electrode 171 may be disposed on the second planarization layer 180. The pixel electrode 171 may be connected to the second anode connection electrode ANDE2 through a third connection contact hole ANCT3 penetrating the second planarization layer 180.

In the top-emission structure in which light exits from the emissive layer 172 toward the common electrode 173, the pixel electrode 171 may be made of a metal material having a high reflectivity such as a stack structure of aluminum and titanium (Ti/Al/Ti), a stack structure of aluminum and indium tin oxide (ITO) (ITO/Al/ITO), an APC alloy and a stack structure of APC alloy and ITO (ITO/APC/ITO). The APC alloy is an alloy of silver (Ag), palladium (Pd), and copper (Cu).

In order to define the first emission area EA1, the second emission area EA2, the third emission area EA3, and the fourth emission area EA4 in FIG. 5, the bank 190 may be formed to partition the pixel electrode 171 on the second planarization layer 180. The bank 190 may be disposed to cover the edge of the pixel electrode 171. The bank 190 may be formed of an organic layer such as an acryl resin, an epoxy resin, a phenolic resin, a polyamide resin, and a polyimide resin.

In each of the first emission area EA1, the second emission area EA2, the third emission area EA3, and the fourth emission area EA4, the pixel electrode 171, the emissive layer 172 and the common electrode 173 are stacked on one another sequentially, so that holes from the pixel electrode 171 and electrons from the common electrode 173 are combined with each other in the emissive layer 172 to emit light.

The emissive layer 172 may be disposed on the pixel electrode 171 and the bank 190. The emissive layer 172 may include an organic material to emit light of a certain color. For example, the emissive layer 172 may include a hole transporting layer, an organic material layer, and an electron transporting layer.

The common electrode 173 may be disposed on the emissive layer 172. The common electrode 173 may be disposed to cover the emissive layer 172. The common electrode 173 may be a common layer formed commonly in the first emission area EA1, the second emission area EA2, the third emission area EA3, and the fourth emission area EA4. A capping layer may be formed on the common electrode 173.

In the top-emission organic light-emitting diode, the common electrode 173 may be formed of a transparent conductive material (TCP) such as ITO and IZO that can transmit light, or a semi-transmissive conductive material such as magnesium (Mg), silver (Ag) and an alloy of magnesium (Mg) and silver (Ag). When the common electrode 173 is formed of a semi-transmissive metal material, the light extraction efficiency can be increased by using microcavities.

An encapsulation layer TFEL may be disposed on the common electrode 173. The encapsulation layer TFEL includes at least one inorganic layer to prevent permeation of oxygen or moisture into the emission material layer EML. In addition, the encapsulation layer TFEL includes at least one organic layer to protect the emission material layer EML from foreign substances such as dust. For example, the encapsulation layer TFEL includes a first inorganic encapsulation layer TFE1, an organic encapsulation layer TFE2 and a second inorganic encapsulation layer TFE3.

The first inorganic encapsulation layer TFE1 may be disposed on the common electrode 173, the organic encapsulation layer TFE2 may be disposed on the first inorganic encapsulation layer TFE1, and the second inorganic encapsulation layer TFE3 may be disposed on the organic encapsulation layer TFE2. The first inorganic encapsulation layer TFE1 and the second inorganic encapsulation layer TFE3 may be made up of multiple layers in which one or more inorganic layers of a silicon nitride layer, a silicon oxynitride layer, a silicon oxide layer, a titanium oxide layer and an aluminum oxide layer are alternately stacked on one another. The organic encapsulation layer TFE2 may be an organic layer such as an acryl resin, an epoxy resin, a phenolic resin, a polyamide resin, a polyimide resin, etc.

The touch sensing unit TSU may be disposed on the encapsulation layer TFEL. The touch sensing unit TSU includes a first touch insulating layer TINS1, connection electrodes BE1, a second touch insulating layer TINS2, the driving electrodes TE, and the sensing electrodes RE.

The first touch insulating layer TINS1 is formed on the front surfaces of the touch sensing area TSA and the touch peripheral area TPA, The first touch insulating layer TINS1 may be made up of an inorganic layer, for example, a silicon nitride layer, a silicon oxynitride layer, a silicon oxide layer, a titanium oxide layer, or an aluminum oxide layer.

The connection electrodes BE1 may be disposed on the first touch insulating layer TINS1 of the touch sensing area TSA. The connection electrode BE1 may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof.

When forming the connection electrode BE1, each of the touch sensing lines RL may be formed and disposed in the touch peripheral area TPA through the same patterning process and the same metal material as those of the connection electrode BEL. Each of the touch sensing lines RL may be patterned in an arrangement shape having a preset interval and a preset length.

The second touch insulating layer TINS2 is formed on the front surface of the first touch insulating layer TINS1 to cover both the connection electrodes BE1 of the touch sensing area TSA and the touch sensing lines RL of the touch peripheral area TPA. The second touch insulating layer TINS2 may be formed as an inorganic layer such as, for example, a silicon nitride layer, a silicon oxynitride layer, a silicon oxide layer, a titanium oxide layer, or an aluminum oxide layer. Alternatively, the second touch insulating layer TINS2 may be formed as an organic layer such as an acryl resin, an epoxy resin, a phenolic resin, a polyamide resin and a polyimide resin.

The driving electrodes TE, sensing electrodes RE, and dummy patterns DE may be formed and disposed on the second touch insulating layer TINS2 of the touch sensing area TSA. The driving electrodes TE, sensing electrodes RE, and dummy patterns DE may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof.

When forming the driving electrodes TE, sensing electrodes RE, and dummy patterns DE, the first and second touch driving lines TL1 and TL2 may be formed and disposed in the touch peripheral area TPA through the same patterning process and the same metal material as those of the driving electrodes TE, sensing electrodes RE, and dummy patterns DE. Each of the first and second touch driving lines TL1 and TL2 may be patterned in an arrangement shape having a preset interval and a preset length. The driving electrodes TE formed through the same patterning process may be formed to be electrically connected to the first and second touch driving lines TL1 and TL2.

The driving electrodes TE and the sensing electrodes RE may overlap with the connection electrodes BE1 in the third direction (z-axis direction). The driving electrodes TE may be connected to the connection electrodes BE1 through touch contact holes TCNT1 penetrating through the second touch insulating layer TINS2. The sensing electrodes RE may be electrically connected to the respective touch sensing lines RL through the touch contact hole TCNT1 penetrating the second touch insulating layer TINS2.

A color filter layer CFL may be formed on the touch sensing area TSA in which the driving electrodes TE, the sensing electrodes RE, and the dummy patterns DE are formed. The color filter layer CFL includes a plurality of first to third color filters CFL1, CFL2, and CFL3. The plurality of first to third color filters CFL1, CFL2, and CFL3 may be disposed in a planar shape on the second touch insulating layer TINS2 including the driving electrodes TE, the sensing electrodes RE, and the dummy patterns DE. For example, the color filter layer CFL may be formed on a third touch insulating layer TINS3 to overlap the first to fourth emission areas EA1, EA2, EA3, and EA4, respectively, but the first to fourth emission areas EA1, EA2, EA3, and EA4 may be formed on the second touch insulating layer TINS2 including the driving electrodes TE and the sensing electrodes RE to overlap the first to fourth emission areas EA1, EA2, EA3, and EA4, respectively.

The first color filter CFL1 may be disposed on the first emission area EA1 emitting light of the first color, the second color filter CFL2 may be disposed on the second emission area EA2 emitting light of the second color, and the third color filter CFL3 may be disposed on the third emission area EA3 emitting light of the third color. In addition, the second color filter CFL2 may be disposed on the fourth emission area EA4 that emits light of the second color.

The first to third color filters CFL1, CFL2, and CFL3 transmit light from the first to fourth emission areas EA1, EA2, EA3, and EA4 and reduce the reflectance of light incident from the outside. The amount of external light may be reduced to approximately ⅓ after it passes through the first to third color filters CFL1, CFL2, and CFL3. Accordingly, the light may be partially extinguished through the first to third color filters CFL1, CFL2, and CFL3.

As shown in FIG. 7, when the color filter layer CFL and the like are formed without forming a separate protective layer on the touch sensing area TSA in which the driving electrodes TE, the sensing electrodes RE and the dummy patterns DE are formed, a manufacturing process for forming a protective layer and the like may be omitted. The manufacturing process of the touch sensing unit TSU may be simplified by omitting the protective layer manufacturing process. On the other hand, the touch lines SL formed in the touch peripheral area TPA, that is, the touch sensing lines RL and the first and second touch driving lines TL1 and TL2 may be exposed to the front. Accordingly, during the cutting process of the display panel 100, a process of temporarily attaching a protective layer to the front surface of the display panel 100 including the touch sensing unit TSU, performing a laser cutting process, and detaching the protective layer after the cutting process may be additionally performed. However, carbide foreign materials may be attached to the touch sensing lines RL and the first and second touch driving lines TL1 and TL2 in the process of detaching the protective layer after the laser cutting. When a carbide foreign material is attached between the touch sensing lines RL and the first and second touch driving lines TL1 and TL2, defects such as an electrical short may occur.

When the spacing between the touch sensing lines RL and the spacing between the first and second touch driving lines TL1 and TL2 are formed to be wider than the size of the carbide foreign materials generated by the laser cutting process, electrical short circuit failure due to the carbide foreign material may be prevented.

Figure 8:
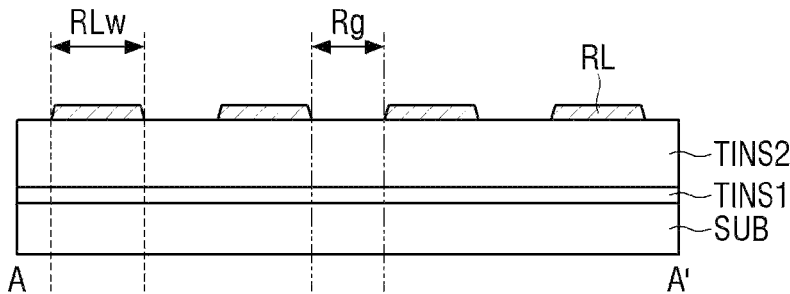
FIG. 8 is a cross-sectional view of an embodiment showing the arrangement of the touch sensing wiring of a touch peripheral area taken along line A-A' of FIG. 5.

FIG. 8 is a cross-sectional view of an embodiment showing the arrangement of the touch sensing wiring of a touch peripheral area taken along line A-A' of FIG. 5.

Referring to FIG. 8, each of the touch sensing lines RL may be formed and disposed in the touch peripheral area TPA through the same patterning process using the same metal material as that of the connection electrode BE1 or the touch electrode SE. The touch sensing lines RL may be formed on any one of the first and second touch insulating layers TINS1 and TINS2. Each of the touch sensing lines RL of the touch peripheral area TPA may be patterned and formed to have a predetermined interval according to a previously designed design shape and to have a predetermined length.

Each of the touch sensing lines RL may be formed and disposed in the touch peripheral area TPA so that a preset first interval Rg is maintained, and a width RLw of the touch sensing lines RL may be formed to be wider than a first interval Rg, which is the horizontal distance between the touch sensing lines RL. Here, the first interval Rg, which is the distance between the touch sensing lines RL, may be formed to be wider than about 30 μm in order to be formed wider than the size of the carbide foreign material generated by the laser cutting process.

When the distance between the touch sensing lines RL is formed to be wider (about 30 μm or more) than the size of the carbide foreign material generated by the laser cutting process, it is possible to prevent an electrical short-circuit failure.

Figure 9:
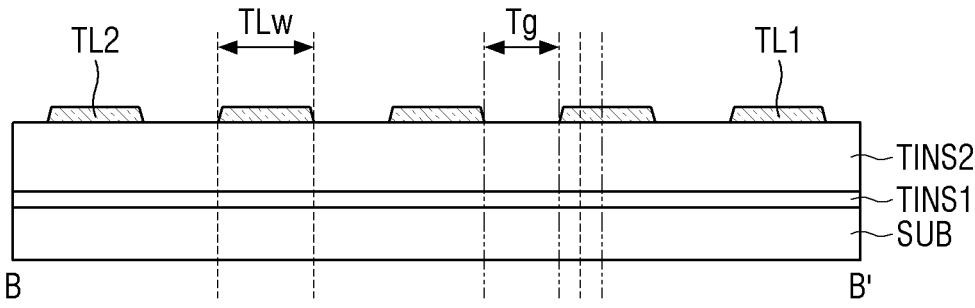
FIG. 9 is a cross-sectional view of an embodiment showing the arrangement of a second touch driving wiring of a touch peripheral area taken along line B-B' of FIG. 5.

FIG. 9 is a cross-sectional view of an embodiment showing the arrangement of a second touch driving line of a touch peripheral area taken along line B-B' of FIG. 5.

Referring to FIG. 9, the first and second touch driving lines TL1 and TL2 may be formed and disposed in the touch peripheral area TPA through the same patterning process using the same metal material as that of the connection electrode BE1 or the touch electrode SE. The first and second touch driving lines TL1 and TL2 may be formed on any one of the first and second touch insulating layers TINS1 and TINS2. The first and second touch driving lines TL1 and TL2 of the touch peripheral area TPA may be patterned and formed to have a predetermined interval according to a previously designed design shape and to have a predetermined length.

The first and second touch driving lines TL1 and TL2 may be formed and disposed in the touch peripheral area TPA so that a preset second interval Tg is maintained, and a width TLw of the first and second touch driving lines TL1 and TL2 may be formed to be wider than the second interval Tg, which is the horizontal distance between first and second touch driving lines TL1 and TL2. Here, the second interval Tg, which is the distance between the first and second touch driving lines TL1 and TL2, may be formed to be wider than about 30 μm in order to be formed wider than the size of the carbide foreign material generated by the laser cutting process.

When the second interval Tg, which is the interval between the first and second touch electrode wirings TL1 and TL2, is formed to be wider (about 30 μm or more) than the size of the carbide foreign material generated by the laser cutting process, it is possible to prevent an electrical short-circuit failure.

Figure 10:
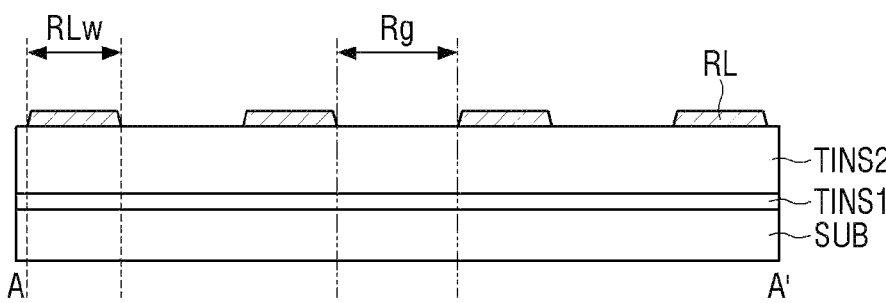
FIG. 10 is a cross-sectional view of another embodiment showing the arrangement of the touch sensing wiring of a touch peripheral area taken along line. A-A' of FIG. 5.

FIG. 10 is a cross-sectional view of another embodiment showing the arrangement of the touch sensing wiring of a touch peripheral area taken along line A-A' of FIG. 5.

Referring to FIG. 10, the touch sensing lines RL may be formed and disposed in the touch peripheral area TPA through the same patterning process as that of the touch electrode SE. Accordingly, the touch sensing lines RL may be formed on the second touch insulating layer TINS2.

Each of the touch sensing lines RL may be formed in the touch peripheral area TPA so that the preset first interval Rg is maintained, and the first interval Rg between the touch sensing lines RL is formed wider than the width RLw of the touch sensing lines RL. In other words, the width RLw of the touch sensing lines RL may be formed to be narrower than the first interval Rg between the touch sensing lines RL. Similarly, the first interval Rg between the touch sensing lines RL may be formed to be wider than about 30 μm in order to be formed wider than the size of the carbide foreign material generated by the laser cutting process.

Figure 11:
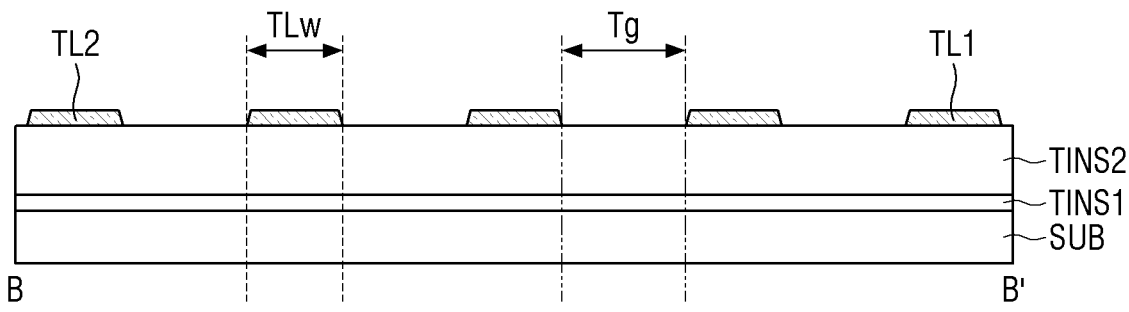
FIG. 11 is a cross-sectional view of another embodiment showing the arrangement of the second touch driving wiring of a touch peripheral area taken along line B-B' of FIG. 5.

FIG. 11 is a cross-sectional view of another embodiment showing the arrangement of the second touch driving wiring of a touch peripheral area taken along line B-B' of FIG. 5.

Referring to FIG. 11, the first and second touch driving lines TL1 and TL2 may be formed and disposed in the touch peripheral area TPA through the same patterning process as that of the touch electrode SE. Accordingly, the first and second touch driving lines TL1 and TL2 may be formed on the second touch insulating layer TINS2.

The first and second touch driving lines TL1 and TL2 may be formed in the touch peripheral area TPA so that the preset second interval Tg is maintained, and the second interval Tg between the first and second touch driving lines TL1 and TL2 may be formed wider than the width TLw of the first and second touch driving lines TL1 and TL2. In other words, the width TLw of the first and second touch driving lines TL1 and TL2 may be formed to be narrower than the second interval Tg between the first and second touch driving lines TL1 and TL2. Similarly, the second interval Tg between the first and second touch driving lines TL1 and TL2 may be formed to be wider than about 30 μm in order to be formed wider than the size of the carbide foreign material generated by the laser cutting process.

Figure 12:
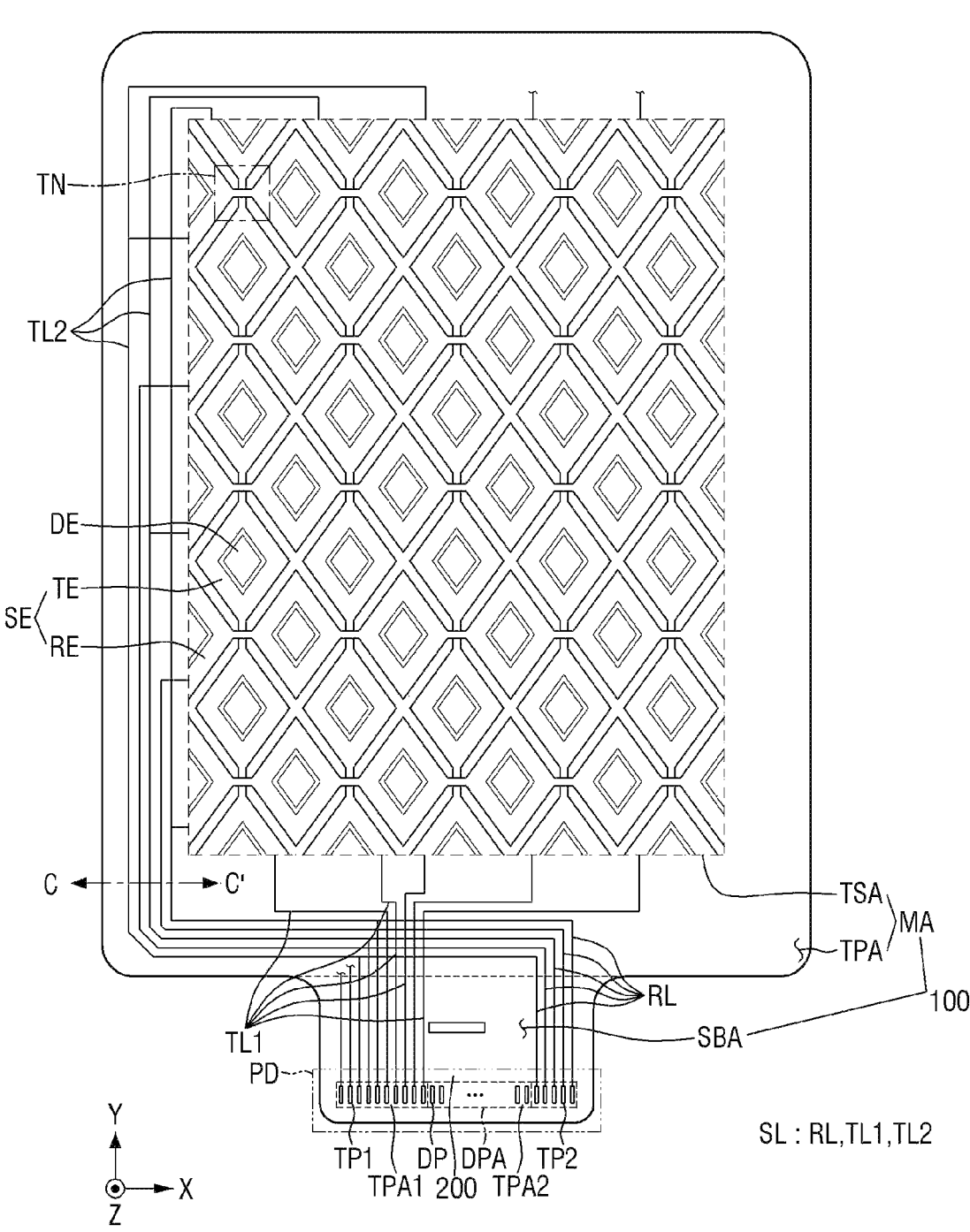
FIG. 12 is a view schematically showing a layout of a touch sensing module of FIG. 3 according to one embodiment.

FIG. 12 is a view schematically showing a layout of a touch sensing module of FIG. 3 according to one embodiment.

Referring to FIG. 12, among the touch lines SL, the touch sensing lines RL, and the second touch driving lines TL2 may be formed in the same direction in the touch peripheral area TPA along the periphery of the touch sensing area TSA.

Specifically, the touch sensing lines RL may be formed and arranged in parallel in one direction of the touch peripheral area TPA along a lower surface and one side of the touch sensing area TSA. In particular, the second touch driving lines TL2 may be formed and arranged in one side direction of the touch peripheral area TPA which is the same direction as the odd-numbered or even-numbered touch sensing lines so that the second touch driving lines TL2 overlap the odd-numbered or even-numbered touch sensing lines RL among the touch sensing lines RL arranged in parallel.

Figure 13:
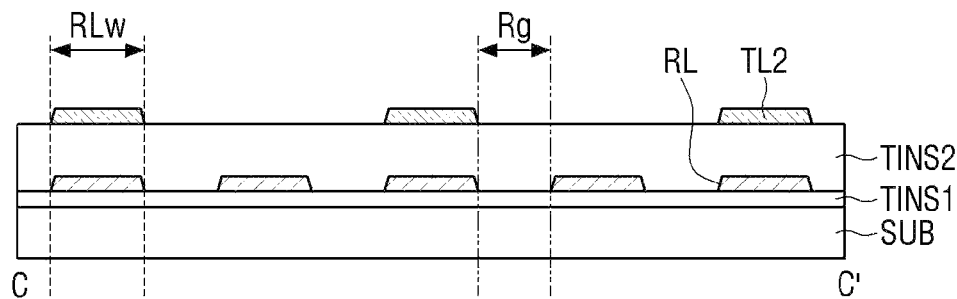
FIG. 13 is a cross-sectional view of an embodiment showing a touch peripheral area taken along line C-C' of FIG. 12.

FIG. 13 is a cross-sectional view of an embodiment showing a touch peripheral area taken along line C-C' of FIG. 12.

Referring to FIG. 13, the touch sensing lines RL may be formed and disposed in the touch peripheral area TPA through the same patterning process as that of the connection electrode BEL. Accordingly, the touch sensing lines RL may be formed on the first touch insulating layer TINS1.

The second touch driving lines TL2 may be formed on the second touch insulating layer TINS2 through the same patterning process as the touch electrodes SE. In this case, the second touch driving lines TL2 may be formed and disposed to overlap the odd-numbered or even-numbered touch sensing lines RL among the touch sensing lines RL arranged in parallel.

The width RLw of the touch sensing lines RL may be formed to be wider than the first interval Rg between the touch sensing lines RL. Alternatively, the first interval Rg between the touch sensing lines RL may be formed to be wider than the width RLw of each of the touch sensing lines RL.

On the other hand, the second interval Tg between the second touch driving lines TL2 formed to overlap the odd-numbered or even-numbered touch sensing lines RL is formed to be wider than the width TLw of the second touch driving lines TL2.

By forming and arranging the second touch driving lines TL2 to overlap the odd-numbered or even-numbered touch sensing lines RL among the touch sensing lines RL, the distance or the gap between the touch sensing lines RL and the second touch driving lines TL2 disposed adjacent to each other remain the same, thereby enabling to maintain resistance between the touch sensing lines RL and the second touch driving lines TL2.

Figure 14:
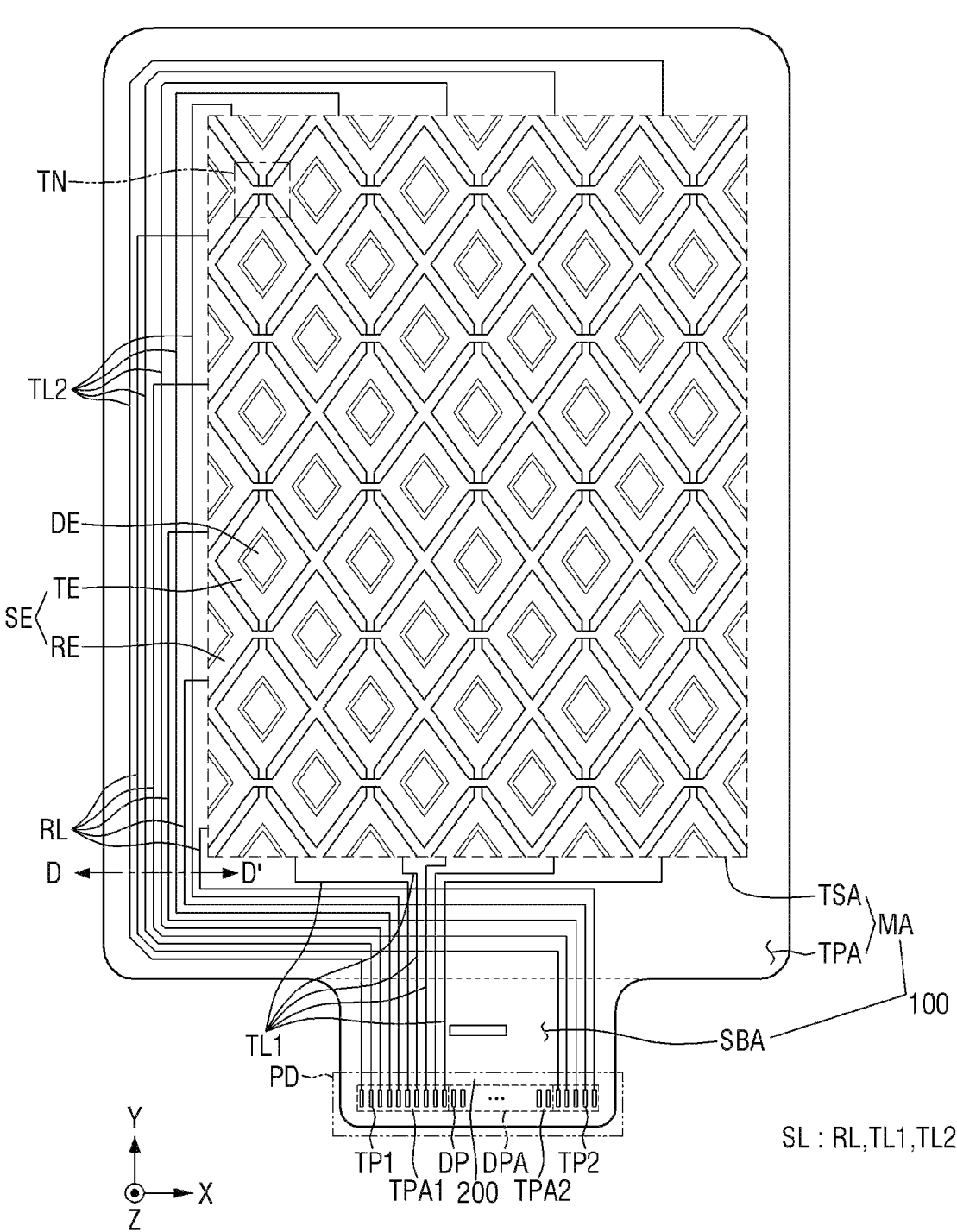
FIG. 14 is a view schematically showing another example of a layout of a touch sensing module illustrated in FIG. 3.

FIG. 14 is a view schematically showing another example of a layout of a touch sensing module illustrated in FIG. 3.

Referring to FIG. 14, the touch sensing lines RL and the second touch driving lines TL2 may be formed in the same direction in the touch peripheral area TPA along the periphery of the touch sensing area TSA.

That is, the touch sensing lines RL may be formed and arranged to be parallel in one direction of the touch peripheral area TPA along the lower surface and one side of the touch sensing area TSA. In addition, the second touch driving lines TL2 are formed and arranged to be parallel in one direction of the same touch peripheral area TPA as the touch sensing lines RL so as not to overlap the touch sensing lines RL arranged in parallel.

Figure 15:
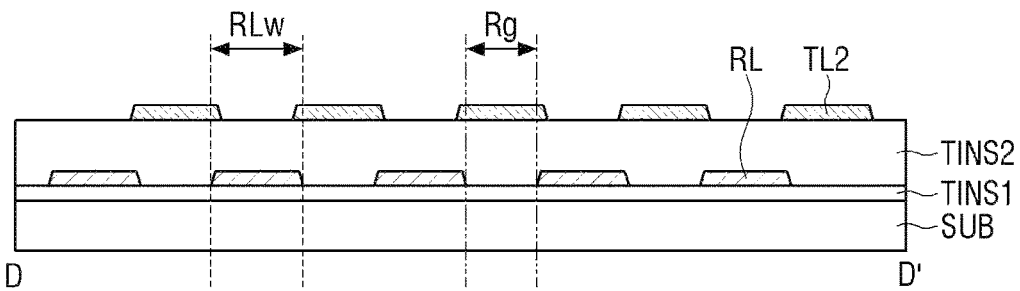
FIG. 15 is a cross-sectional view of an embodiment showing a touch peripheral area taken along line D-D' of FIG. 14.

FIG. 15 is a cross-sectional view of an embodiment showing a touch peripheral area taken along line D-D' of FIG. 14.

Referring to FIG. 15, the touch sensing lines RL may be formed and disposed in the touch peripheral area TPA through the same patterning process as that of the connection electrode BE1. Accordingly, the touch sensing lines RL may be formed on the first touch insulating layer TINS1.

The second touch driving lines TL2 may be formed and disposed in the touch peripheral area TPA through the same patterning process as that of the touch electrodes SE, Accordingly, the touch sensing lines RL may be formed on the second touch insulating layer TINS2.

The touch sensing lines RL and the second touch driving lines TL2 may be formed on different layers with the second touch insulating layer TINS2 interposed therebetween and may be formed in the same direction in parallel to not overlap each other.

The width RLw of the touch sensing lines RL may be formed to be wider than the first interval Rg between the touch sensing lines RL. In addition, the width TLw of the second touch driving lines TL2 may be formed to be wider than a second interval Tg between the second touch driving lines TL2.

Accordingly, an interval between the touch sensing lines RL and the second touch driving lines TL2 formed on different layers, that is, a distance or an interval between the touch sensing lines RL and the second touch driving lines adjacent to each other on different layers may be maintained to be the same. In addition, by forming the second interval Tg between the second touch driving lines TL2 which are wider (about 30 μm or more) than the size of the carbide foreign material generated by the laser cutting process, it is possible to prevent an electrical short-circuit failure.

Figure 16:
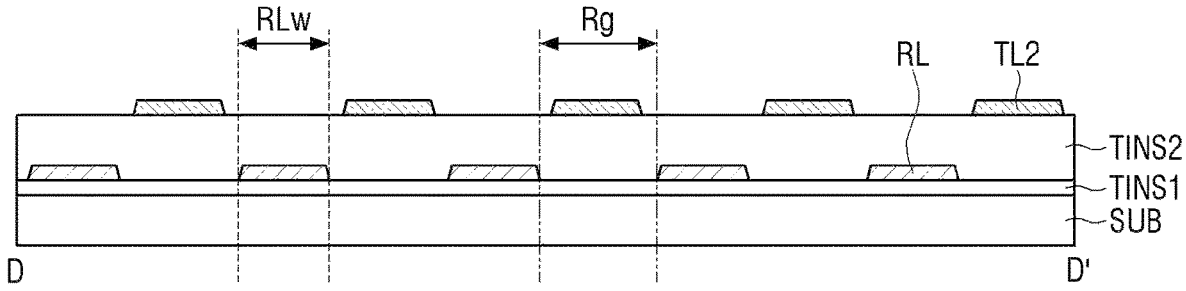
FIG. 16 is a cross-sectional view of another embodiment showing a touch peripheral area taken along line D-D' of FIG. 14.

FIG. 16 is a cross-sectional view of another embodiment showing a touch peripheral area taken along line D-D' of FIG. 14.

Referring to FIG. 16, the first interval Rg between the touch sensing lines RL formed on the first touch insulating layer TINS1 may be wider than the width RLw of the touch sensing lines RL. In other words, the width RLw of the touch sensing lines RL may be formed to be narrower than the first interval Rg between the touch sensing lines RL.

A second interval Tg between the second touch driving wires TL2 formed on a layer different from the touch sensing wires RL, that is, on the second touch insulating layer TINS2, may be formed to be wider than the width TLw of the second touch driving wires TL2. In other words, the width TLw of the second touch driving lines TL2 may be formed to be narrower than the second interval Tg between the second touch driving lines TL2. In particular, by forming the second interval Tg between the second touch driving lines TL2 which are wider (about 30 μm or more) than the size of the carbide foreign material generated by the laser cutting process, it is possible to prevent an electrical short-circuit failure.

In addition, as shown in FIG. 16, the distance or interval between the touch sensing lines RL and the second touch driving lines TL2 disposed adjacent to each other in different layers is maintained to be the same, thereby enabling the resistance between the touch sensing lines RL and the second touch driving lines TL2 to maintain the same.

Figure 17:
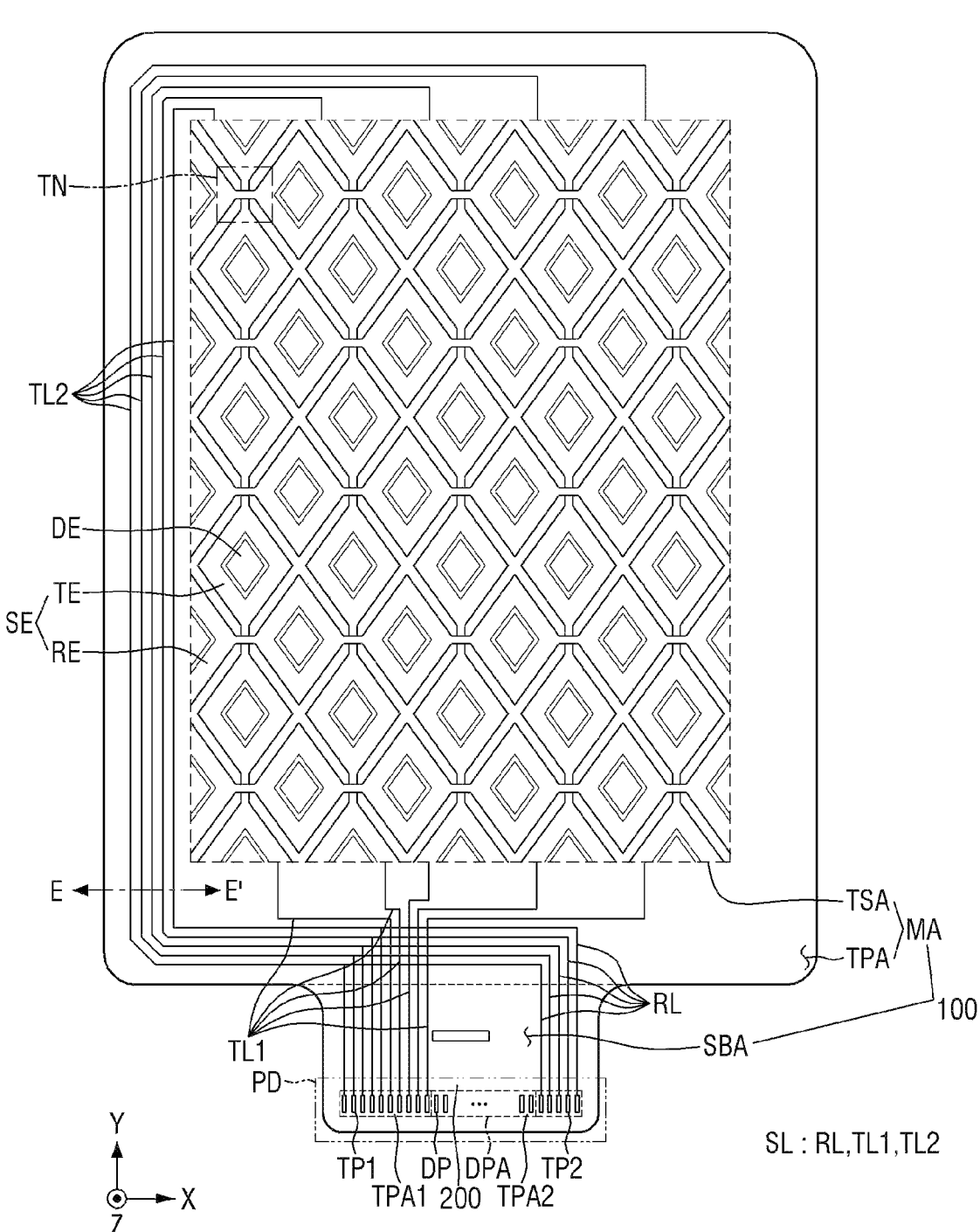
FIG. 17 is a view schematically showing still another example of a layout of a touch module illustrated in FIG. 3.

FIG. 17 is a view schematically showing still another example of a layout of a touch module illustrated in FIG. 3.

Referring to FIG. 17, the touch sensing lines RL and the second touch driving lines TL2 may be formed in the same direction in the touch peripheral area TPA along the periphery of the touch sensing area TSA.

Specifically, the touch sensing lines RL may be formed and arranged in parallel in one direction of the touch peripheral area TPA along a lower surface and one side of the touch sensing area TSA. In particular, the second touch driving lines TL2 may be formed and arranged in one direction of the same touch peripheral area TPA as the touch sensing lines RL to overlap the touch sensing lines RL arranged in parallel.

Figure 18:
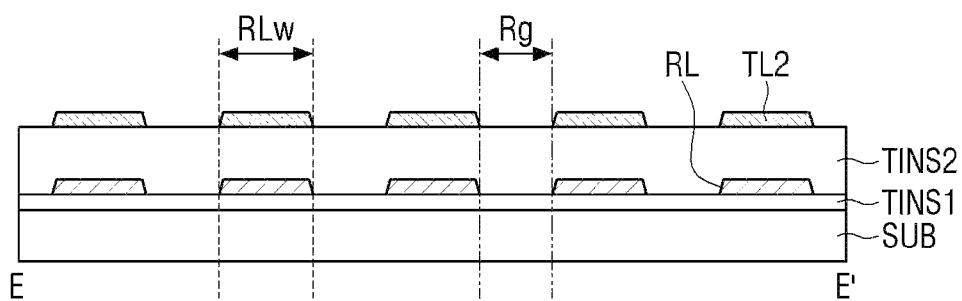
FIG. 18 is a cross-sectional view of an embodiment showing a touch peripheral area taken along line E-E' of FIG. 17.

FIG. 18 is a cross-sectional view of an embodiment showing a touch peripheral area taken along line E-E' of FIG. 17.

Referring to FIG. 18, the touch sensing lines RL may be formed and disposed in the touch peripheral area TPA through the same patterning process as that of the connection electrode BEL. Accordingly, the touch sensing lines RL may be formed on the first touch insulating layer TINS1.

The second touch driving lines TL2 may be formed and disposed in the touch peripheral area TPA through the same patterning process as that of the touch electrodes SE. Accordingly, the touch sensing lines RL may be formed on the second touch insulating layer TINS2.

Tb touch sensing lines RL and the second touch driving lines TL2 may be formed on different layers with the second touch insulating layer TINS2 interposed therebetween and may be formed in parallel in the same direction to overlap each other.

Tb width RLw of the ouch sensing lines RL nay be formed to be wider than the first interval Rg between the touch sensing lines RL. The width TLw of the second touch driving lines TL2 overlapping the touch sensing lines RL may also be formed to be wider than the second interval Tg between the second touch driving lines TL2.

Accordingly, an interval between the touch sensing lines R-L and the second touch driving lines TL2 formed on different layers, that is, the distance or the interval between the touch sensing lines RL and the second touch driving lines TL2 arranged adjacent to each other in different layers, may be arranged to be maintained the same.

Figure 19:
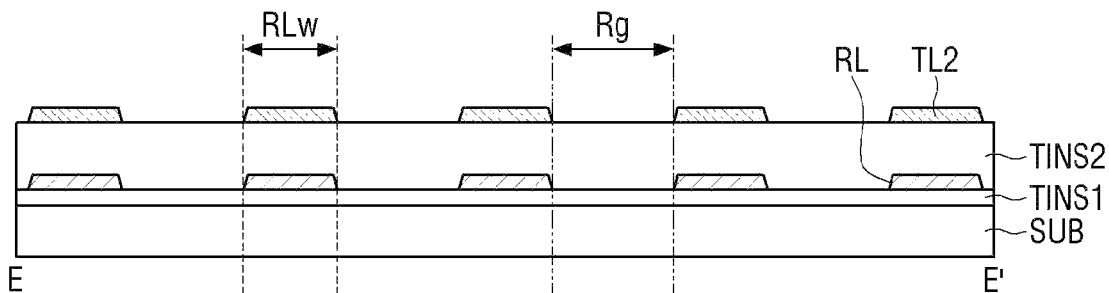
FIG. 19 is a cross-sectional view of another embodiment showing a touch peripheral area taken along line E-E' of FIG. 17.

FIG. 19 is a cross-sectional view of another embodiment showing a touch peripheral area taken along line E-F of FIG. 17.

Referring to FIG. 19, the first interval Rg between the touch sensing lines RL formed on the first touch insulating layer TINS1 may be formed to be wider than the width RLw of the touch sensing lines RL. In other words, the width RLw of the touch sensing lines RL may be formed to be narrower than the first interval Rg between the touch sensing lines RL.

The second interval Tg between the second touch driving lines TL2 formed on the second touch insulating layer TINS2 to overlap the touch sensing lines RL may also be formed to be wider than the width TLw of the second touch driving lines TL2. In other words, the width TLw of the second touch driving lines TL2 may be formed to be narrower than the second interval Tg between the second touch driving lines TL2. In this case, by forming the second interval Tg between the second touch driving lines TL2 wider (about 30 μm or more) than the size of the carbide foreign material generated by the laser cutting process, it is possible to prevent an electrical short-circuit failure.

In addition, as shown in FIGS. 18 and 19, the distances or intervals between the touch sensing lines RL and the second touch driving lines TL2 disposed to overlap each other on different layers are maintained to be the same, so that all resistances between the lines RL and the second touch driving lines TL2 may be maintained to be the same.

Figure 20:
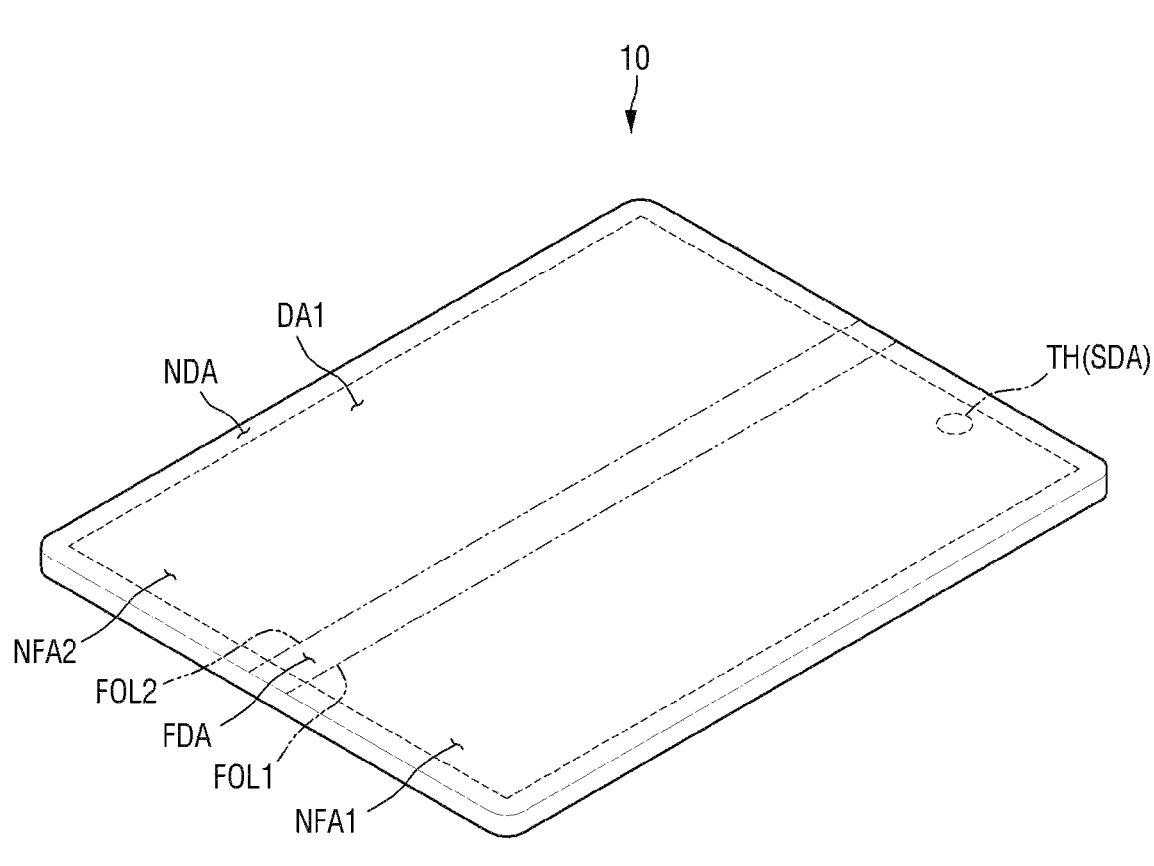
FIGS. 20 and 21 are perspective views showing a display device according to another embodiment.
Figure 20:
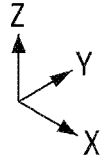
Figure 21:
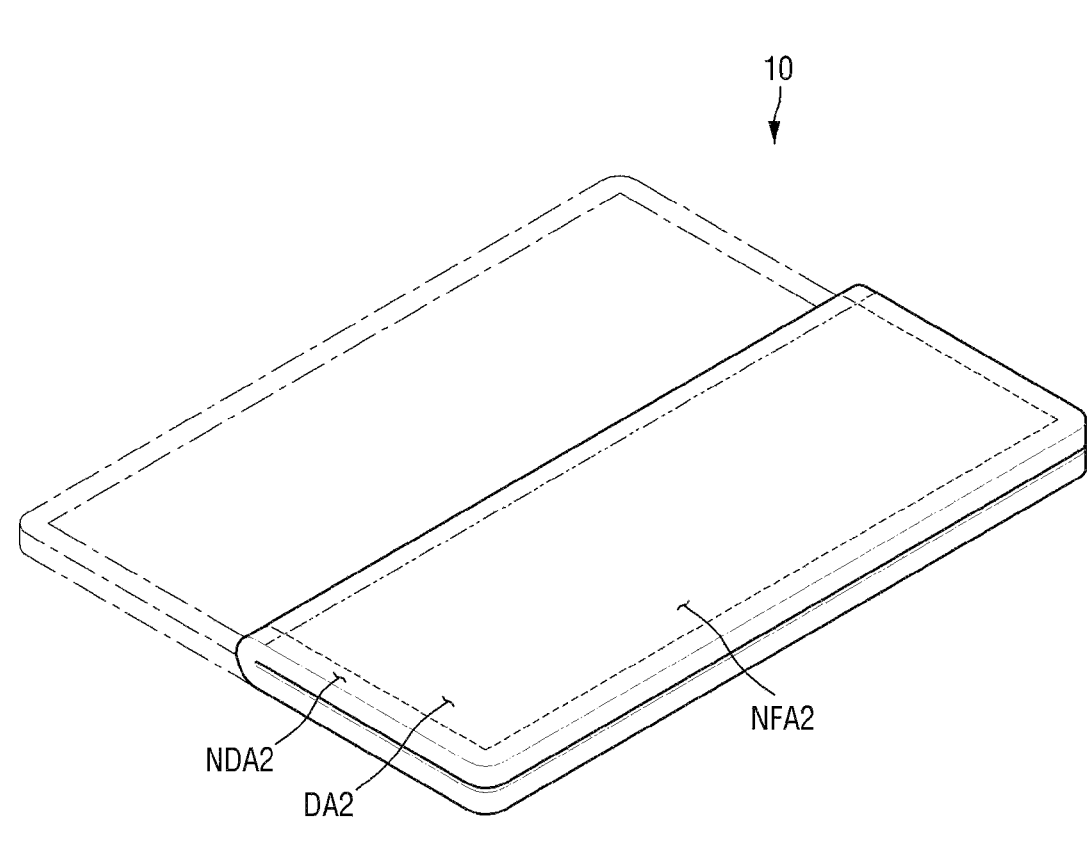
Figure 21:
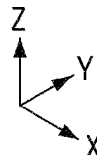

FIGS. 20 and 21 are perspective views showing a display device according to another embodiment.

In the example shown in FIGS. 20 and 21, a display device 10 is a foldable display device that is folded in the first direction (x-axis direction). The display device 10 may remain folded as well as unfolded. The display device 10 may be folded inward (in-folding manner) such that the front surface is located inside. When the display device 10 is bent or folded in the in-folding manner, a part of the front surface of the display device 10 may face the other part of the front surface. Alternatively, the display device 10 may be folded outward (out-folding manner) such that the front surface is located outside. When the display device 10 is bent or folded in the out-folding manner, a part of the rear surface of the display device 10 may face the other part of the rear surface.

The first non-folding area NFA1 may be disposed on one side, for example, the right side of the folding area FDA. The second non-folding area NFA2 may be disposed on the opposite side, for example, the left side of the folding area FDA. The touch sensing unit TSU according to the embodiment of the present disclosure may be formed and disposed on each of the first non-folding area NFA1 and the second non-folding area NFA2.

A first folding line FOL1 and a second folding line FOL2 may be extended in the second direction (y-axis direction), and the display device 10 may be folded in the first direction (x-axis direction). As a result, the length of the display device 10 in the first direction (x-axis direction) may be reduced to about half, so that a user can carry the display device 10 easily.

The direction in which the first folding line FOL1 and the second folding line FOL2 are extended is not limited to the second direction (y-axis direction). For example, the first folding line FOL1 and the second folding line FOL2 may be extended in the first direction (x-axis direction), and the display device 10 may be folded in the second direction (y-axis direction). In such case, the length of the display device 10 in the second direction (y-axis direction) may be reduced to about half. Alternatively, the first folding line FOL1 and the second folding line FOL2 may be extended in a diagonal direction of the display device 10 between the first direction (x-axis direction) and the second direction (y-axis direction). In such case, the display device 10 may be folded in a triangle shape.

When the first folding line FOL1 and the second folding line FOL2 are extended in the second direction (y-axis direction), the length of the folding area FDA in the first direction (x-axis direction) may be smaller than the length in the second direction (y-axis direction). In addition, the length of the first non-folding area NFA1 in the first direction (x-axis direction) may be larger than the length of the folding area FDA in the first direction (x-axis direction). The length of the second non-folding area NFA2 in the first direction (x-axis direction) may be larger than the length of the folding area FDA in the first direction (x-axis direction).

The first display area DA1 may be disposed on the front side of the display device 10. The first display area DA1 may overlap the folding area FDA, the first non-folding area NFA1, and the second non-folding area NFA2. Therefore, when the display device 10 is unfolded, images may be displayed on the front side of the folding area FDA, the first non-folding area NFA1 and the second non-folding area NFA2 of the display device 10.

The second display area DA2 may be disposed on the rear side of the display device 10. The second display area DA2 may overlap the second non-folding area NFA2. Therefore, when the display device 10 is folded, images may be displayed on the front side of the second non-folding area NFA2 of the display device 10.

Although a through hole TH where a camera SDA or the like is formed is defined in the first non-folding area NFA1 in FIGS. 20 and 21, the present disclosure is not limited thereto. The through hole TH where the camera SDA is formed may be defined in the second non-folding area NFA2 or the folding area FDA.

Figure 22:
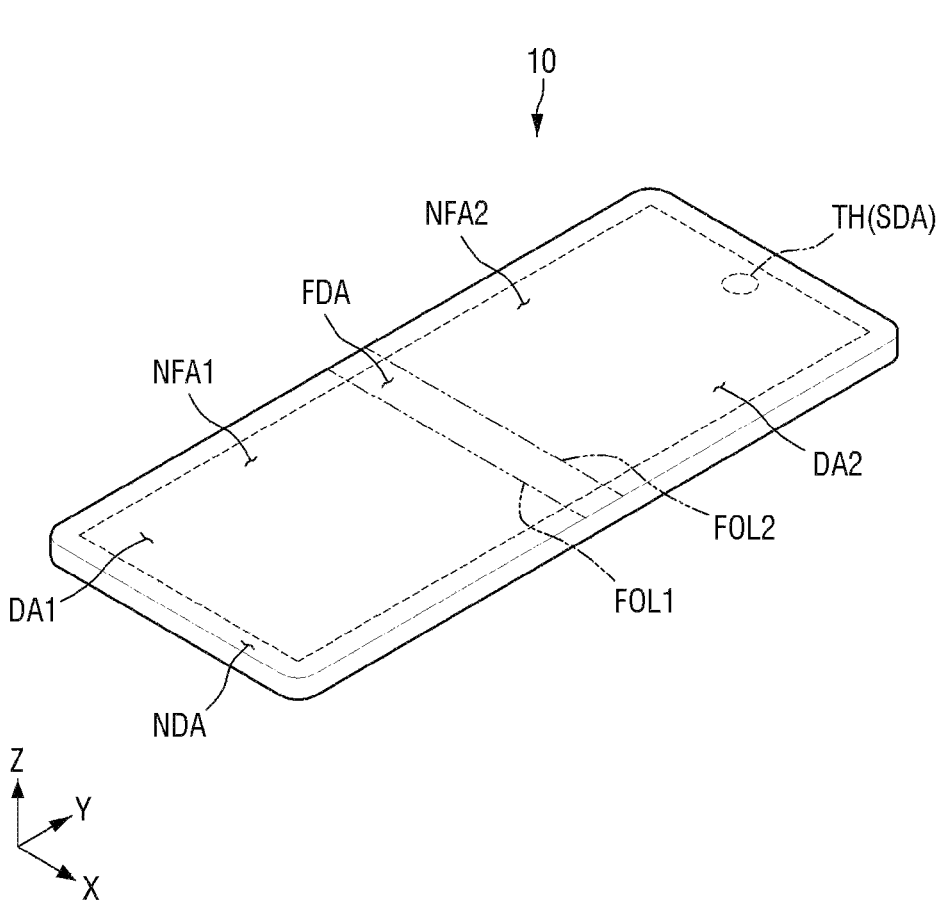
FIGS. 22 and 23 are perspective views showing a display device according to still another embodiment.
Figure 23:
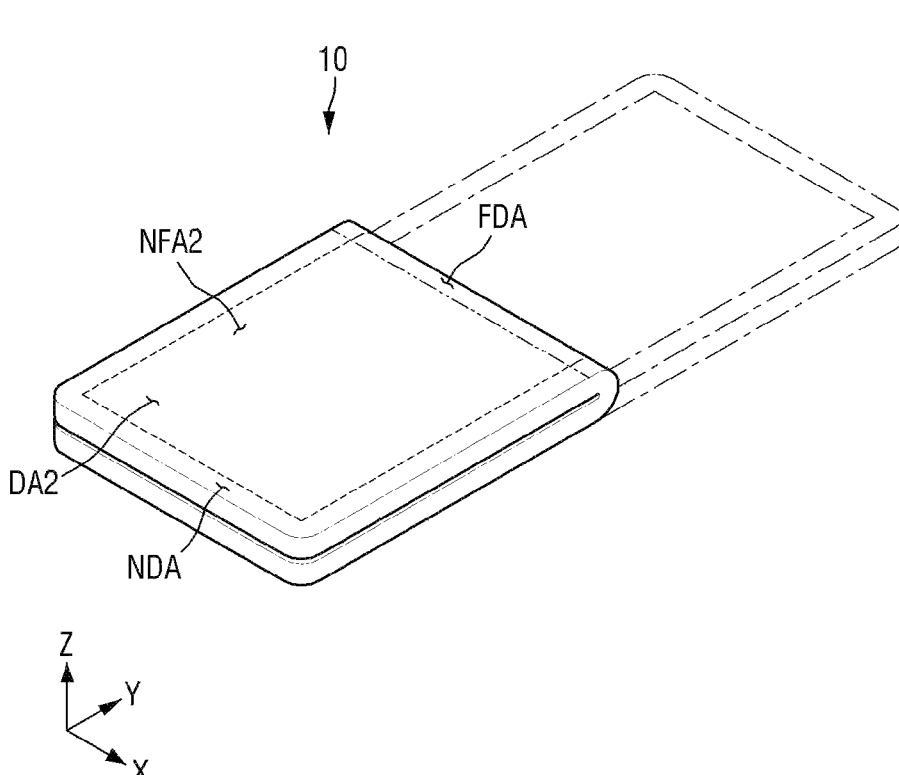

FIGS. 22 and 23 are perspective views showing a display device according to still another embodiment.

In the example shown in FIGS. 22 and 23, a display device 10 is a foldable display device that is folded in the second direction (y-axis direction). The display device 10 may remain folded as well as unfolded. The display device 10 may be folded inward (in-folding manner) such that the front surface is located inside. When the display device 10 is bent or folded in the in-folding manner, a part of the front surface of the display device 10 may face the other part of the front surface. Alternatively, the display device 10 may be folded outward (out-folding manner) such that the front surface is located outside. When the display device 10 is bent or folded in the out-folding manner, a part of the rear surface of the display device 10 may face the other part of the rear surface.

The display device 10 may include a folding area FDA, a first non-folding area NFA1, and a second non-folding area NFA2. The display device 10 can be folded at the folding area FDA, while it cannot be folded at the first non-folding area NFA1 and the second non-folding area NFA2. The first non-folding area NFA1 may be disposed on one side, for example, the lower side of the folding area FDA. The second non-folding area NFA2 may be disposed on the other side, for example, the upper side of the folding area FDA.

The touch sensing unit TSU according to the embodiment of the present disclosure may be formed and disposed on each of the first non-folding area NFA1 and the second non-folding area NFA2.

The folding area FDA may be an area bent with a predetermined curvature over the first folding line FOL1 and the second folding line FOL2. Therefore, the first folding line FOL1 may be a boundary between the folding area FDA and the first non-folding area NFA1, and the second folding line FOL2 may be a boundary between the folding area FDA and the second non-folding area NFA2.

The first folding line FOL1 and the second folding line FOL2 may be extended in the first direction (x-axis direction) as shown in FIGS. 22 and 23, and the display device 10 may be folded in the second direction (y-axis direction). As a result, the length of the display device 10 in the second direction (the y-axis direction) may be reduced to about half, so that the display device 10 is easy to carry.

The direction in which the first folding line FOL1 and the second folding line FOL2 are extended is not limited to the first direction (x-axis direction). For example, the first folding line FOL1 and the second folding line FOL2 may be extended in the second direction (y-axis direction), and the display device 10 may be folded in the first direction (x-axis direction). In such case, the length of the display device 10 in the first direction (x-axis direction) may be reduced to about half. Alternatively, the first folding line FOL1 and the second folding line FOL2 may be extended in a diagonal direction of the display device 10 between the first direction (x-axis direction) and the second direction (y-axis direction). In such case, the display device 10 may be folded in a triangle shape.

When the first folding line FOL1 and the second folding line FOL2 are extended in the first direction (x-axis direction) as shown in FIGS. 22 and 23, the length of the folding area FDA in the second direction (y-axis direction) may be smaller than the length in the first direction (x-axis direction). In addition, the length of the first non-folding area NFA1 in the second direction (y-axis direction) may be larger than the length of the folding area FDA in the second direction (y-axis direction). The length of the second non-folding area NFA2 in the second direction (y-axis direction) may be larger than the length of the folding area FDA in the second direction (y-axis direction).

The first display area DA1 may be disposed on the front side of the display device 10. The first display area DA1 may overlap the folding area FDA, the first non-folding area NFA1, and the second non-folding area NFA2. Therefore, when the display device 10 is unfolded, images may be displayed on the front side of the folding area FDA, the first non-folding area NFA1 and the second non-folding area NFA2 of the display device 10.

The second display area DA2 may be disposed on the rear side of the display device 10. The second display area DA2 may overlap the second non-folding area NFA2. Therefore, when the display device 10 is folded, images may be displayed on the front side of the second non-folding area NFA2 of the display device 10.

Although the through hole TH where the camera SDA or the like is disposed is defined in the second non-folding area NFA2 in FIGS. 22 and 23, the present disclosure is not limited thereto. The through hole TH may be defined in the first non-folding area NFA1 or the folding area FDA.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A touch detection module comprising:
a plurality of driving electrodes arranged side by side in a touch sensing area;
a plurality of sensing electrodes alternately arranged with the plurality of driving electrodes;
a plurality of touch driving lines arranged in a touch peripheral area to supply touch driving signals to the plurality of driving electrodes;

a plurality of touch sensing lines arranged in the touch peripheral area to transmit touch sensing signals from the plurality of sensing electrodes; and
a touch driving circuit receiving the touch sensing signals to detect a touch position coordinate,
wherein at least one pair of lines among the plurality of touch driving lines and the plurality of touch sensing lines is formed to have a first interval or a second interval according to a preset size of a foreign material,
wherein the plurality of touch driving lines is formed through a same patterning process and with a same metal material as the plurality of driving electrodes and the plurality of sensing electrodes,
wherein the plurality of touch sensing lines is formed through a same patterning process and with a same metal material as a plurality of connection electrodes which electrically connects driving electrodes adjacent to each other among the plurality of driving electrodes, and
wherein the plurality of touch driving lines connected to the plurality of driving electrodes are disposed on a different layer than the plurality of touch sensing lines connected to the plurality of sensing electrodes.

2. The touch detection module of claim 1, wherein the plurality of connection electrodes is formed in the touch sensing area of a layer different from the plurality of driving electrodes and the plurality of sensing electrodes.

3. The touch detection module of claim 2,
wherein the plurality of touch sensing lines is arranged in the touch peripheral area, and
wherein the first interval between the plurality of touch sensing lines is formed to be wider than a width of each of the plurality of touch sensing lines.

4. The touch detection module of claim 2,
wherein the plurality of touch driving lines is formed and arranged in the touch peripheral area so that the second interval is maintained, and
wherein the second interval between the plurality of touch driving lines is formed to be wider than a width of each of the plurality of touch driving lines.

5. The touch detection module of claim 2,
wherein the plurality of touch sensing lines is formed and aligned side by side in one side of the touch peripheral area along a bottom surface and one side surface of the touch sensing area, and
wherein the plurality of touch driving lines is formed and aligned side by side in a same side of the touch peripheral area as the plurality of touch sensing lines and does not overlap the plurality of touch sensing lines.

6. The touch detection module of claim 2,
wherein the plurality of touch sensing lines is formed on a first touch insulating layer of the touch peripheral area and aligned side by side in one side of the touch peripheral area, and
wherein the plurality of touch driving lines is aligned in a same side of the touch peripheral area as the plurality of touch sensing lines and overlaps odd-numbered or even-numbered touch sensing lines among the plurality of touch sensing lines, respectively.

7. The touch detection module of claim 6,
wherein the plurality of touch sensing lines is disposed to maintain the first interval, and
wherein the first interval between the plurality of touch sensing lines is formed to be wider than a width of each of the plurality of touch sensing lines.

8. The touch detection module of claim 7,
wherein the second interval between the plurality of touch driving lines overlapping each of the odd-numbered or even-numbered touch sensing lines is formed to be wider than a width of the plurality of touch driving lines and the first interval.

9. The touch detection module of claim 2,
wherein the plurality of touch sensing lines is formed on a first touch insulating layer of the touch peripheral area, and
wherein the plurality of touch driving lines is formed on a second touch insulating layer of the touch peripheral area through the same patterning process as that of the plurality of driving electrodes not to overlap each of the plurality of touch sensing electrodes.

10. The touch detection module of claim 9,
wherein the plurality of touch driving lines is disposed to maintain the second interval, and
wherein a width of each of the plurality of touch driving lines is formed to be wider than the second interval between the plurality of touch driving lines.

11. The touch detection module of claim 9,
wherein the plurality of touch driving lines is disposed to maintain the second interval, and
wherein the second interval between the plurality of touch driving lines is formed to be wider than a width of each of the plurality of touch driving lines.

12. The touch detection module of claim 2,
wherein the plurality of touch sensing lines is formed on a first touch insulating layer of the touch peripheral area, and
wherein the plurality of touch driving lines is formed on a second touch insulating layer of the touch peripheral area to overlap each of the plurality of touch sensing lines through the same patterning process as that of the plurality of driving electrodes.

13. The touch detection module of claim 12,
wherein the plurality of touch driving lines is disposed to maintain the second interval, and
wherein a width of each of the plurality of touch driving lines is formed to be wider than the second interval between the plurality of touch driving lines.

14. The touch detection module of claim 12,
wherein the plurality of touch driving lines is disposed to maintain the second interval, and
wherein the second interval between the plurality of touch driving lines is formed to be wider than a width of each of the plurality of touch driving lines.

15. A display device comprising:
a display panel including a display area in which a plurality of pixels is disposed; and
a touch detection module disposed on a front surface of the display panel to sense a user's touch,
wherein the touch detection module includes a plurality of driving electrodes aligned side by side in a touch sensing area, a plurality of sensing electrodes alternately aligned with the plurality of driving electrodes, a plurality of touch driving lines aligned in a touch peripheral area to supply touch driving signals to the plurality of driving electrodes, a plurality of touch sensing lines aligned in the touch peripheral area to transmit touch sensing signals from the plurality of sensing electrodes, and a touch driving circuit receiving the touch sensing signals to detect a touch position coordinate,
wherein at least one pair of lines among the plurality of touch driving lines and the plurality of touch sensing lines is formed to have a first interval or a second interval according to a preset size of a foreign material,
wherein the plurality of touch driving lines is formed through a same patterning process and with a same metal material as the plurality of driving electrodes and the plurality of sensing electrodes,
wherein the plurality of touch sensing lines is formed through a same patterning process and with a same metal material as a plurality of connection electrodes which electrically connects driving electrodes adjacent to each other among the plurality of driving electrodes, and
wherein the plurality of touch driving lines connected to the plurality of driving electrodes are disposed on a different layer than the plurality of touch sensing lines connected to the plurality of sensing electrodes.

16. The display device of claim 15,
wherein the plurality of connection electrodes is formed in the touch sensing area of a layer different from the plurality of driving electrodes and the plurality of sensing electrodes.

17. The display device of claim 16,
wherein the plurality of touch sensing lines is formed and aligned side by side in one side of the touch peripheral area along a bottom surface and one side surface of the touch sensing area, and
wherein the plurality of touch driving lines is formed and aligned in parallel to the plurality of the touch sensing lines and does not overlap the plurality of touch sensing lines.

18. The display device of claim 17,
wherein the plurality of touch sensing lines is formed on a first touch insulating layer of the touch peripheral area, and
wherein the plurality of touch driving lines is formed on a second touch insulating layer of the touch peripheral area through the same patterning process as the plurality of driving electrodes so that each of the plurality of touch driving lines does not overlap the plurality of touch sensing lines and is disposed side by side.

19. The display device of claim 16,
wherein the plurality of touch sensing lines is formed on a first touch insulating layer of the touch peripheral area, and
wherein each of the plurality of touch driving lines is formed to respectively overlap the plurality of touch sensing lines on a second touch insulating layer of the touch peripheral area through the same patterning process as the plurality of driving electrodes.

20. The display device of claim 16,
wherein the plurality of touch sensing lines is formed on a first touch insulating layer of the touch peripheral area, and
wherein the plurality of touch driving lines is aligned in a same side of the touch peripheral area as the plurality of touch sensing lines and overlaps odd-numbered or even-numbered touch sensing lines among the plurality of touch sensing lines.

21. An electronic device including a display device,
wherein the display device comprises:
a display panel including a display area in which a plurality of pixels is disposed; and
a touch detection module disposed on a front surface of the display panel to sense a user's touch,
wherein the touch detection module includes a plurality of driving electrodes aligned side by side in a touch sensing area, a plurality of sensing electrodes alternately aligned with the plurality of driving electrodes, a plurality of touch driving lines aligned in a touch peripheral area to supply touch driving signals to the plurality of driving electrodes, a plurality of touch sensing lines aligned in the touch peripheral area to transmit touch sensing signals from the plurality of sensing electrodes, and a touch driving circuit receiving the touch sensing signals to detect a touch position coordinate, wherein at least one pair of lines among the plurality of touch driving lines and the plurality of touch sensing lines is formed to have a first interval or a second interval according to a preset size of a foreign material, wherein the plurality of touch driving lines is formed through a same patterning process and with a same material as the plurality of driving electrodes and the plurality of sensing electrodes, wherein the plurality of touch sensing lines is formed through a same patterning process and with a same metal material as a plurality of connection electrodes which electrically connects driving electrodes adjacent to each other among the plurality of driving electrodes, and wherein the plurality of touch driving lines connected to the plurality of driving electrodes are disposed on a different layer than the plurality of touch sensing lines connected to the plurality of sensing electrodes.

\* \* \* \* \*